US012136339B2

(12) United States Patent
Yusa

(10) Patent No.: US 12,136,339 B2
(45) Date of Patent: Nov. 5, 2024

(54) TRAFFIC MONITORING APPARATUS, TRAFFIC MONITORING SYSTEM, TRAFFIC MONITORING METHOD, AND NON-TRANSITORY COMPUTER READABLE MEDIUM STORING PROGRAM

(71) Applicant: NEC Corporation, Tokyo (JP)

(72) Inventor: Michihiko Yusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1044 days.

(21) Appl. No.: 17/041,750

(22) PCT Filed: Mar. 26, 2019

(86) PCT No.: PCT/JP2019/012813
§ 371 (c)(1),
(2) Date: Sep. 25, 2020

(87) PCT Pub. No.: WO2019/189152
PCT Pub. Date: Oct. 3, 2019

(65) Prior Publication Data

US 2021/0043076 A1 Feb. 11, 2021

(30) Foreign Application Priority Data

Mar. 29, 2018 (JP) ................................ 2018-066014

(51) Int. Cl.
*G08G 1/01* (2006.01)
*G08G 1/056* (2006.01)

(52) U.S. Cl.
CPC ......... *G08G 1/0145* (2013.01); *G08G 1/0112* (2013.01); *G08G 1/0133* (2013.01); *G08G 1/056* (2013.01)

(58) Field of Classification Search
None
See application file for complete search history.

(56) References Cited

U.S. PATENT DOCUMENTS

2013/0325284 A1 12/2013 Sato

FOREIGN PATENT DOCUMENTS

CN 103714706 A * 4/2014
JP 2002230686 A * 8/2002
(Continued)

OTHER PUBLICATIONS

International Search Report corresponding to PCT/JP2019/012813, mail date Jun. 25, 2019, 1 page.
(Continued)

*Primary Examiner* — Christian Chace
*Assistant Examiner* — Katherine Marie Fitzharris

(57) ABSTRACT

A traffic monitoring apparatus (10) includes a vehicle information acquisition unit (11), a congestion determination unit (13), and a priority calculation unit (16). The vehicle information acquisition unit (11) acquires, from data received from each of a plurality of detection apparatuses (20), vehicle information regarding travelling states of vehicles that are present in the vicinity of a plurality of respective intersections. The congestion determination unit (13) determines, for each of the plurality of intersections, whether or not congestion is occurring based on the vehicle information and determines an intersection where the congestion has occurred to be a congested intersection. The priority calculation unit (16) calculates, for each of the plurality of continuous congestion paths, a priority level for implementing measures to eliminate congestion based on at least the vehicle travelling direction in the continuous congestion path.

18 Claims, 29 Drawing Sheets

(56) References Cited

FOREIGN PATENT DOCUMENTS

| | | | | |
|---|---|---|---|---|
| JP | 2005-267269 | A | | 9/2005 |
| JP | 2008-065529 | A | | 3/2008 |
| JP | 2011-017616 | A | | 1/2011 |
| JP | 2011-043943 | A | | 3/2011 |
| JP | 2012-206688 | A | | 10/2012 |
| JP | 2013-72660 | A | | 4/2013 |
| JP | 2013072660 | A | * | 4/2013 |
| JP | 2015-028675 | A | | 2/2015 |
| JP | 2015-88005 | A | | 5/2015 |

OTHER PUBLICATIONS

IN Office Communication for IN Application No. 202017041545, mailed on Feb. 21, 2024 with English Translation.

* cited by examiner

| | |
|---|---|
| TRAFFIC OBSTACLE | · STOPPED VEHICLE IS PRESENT<br>· SPEED REDUCED IN SHORT PERIOD OF TIME |
| CONGESTION CAUSE | · TRAFFIC ACCIDENT (NUMBER OF VEHICLES: TWO OR MORE)<br>· DISABLED VEHICLE (NUMBER OF VEHICLES: ONE) |

| | |
|---|---|
| TRAFFIC OBSTACLE | ·THERE IS OBJECT IN LANE<br>·THERE IS VEHICLE CHANGING LANES |
| CONGESTION CAUSE | FALLING OBJECT |

| | |
|---|---|
| TRAFFIC OBSTACLE | · THERE IS STOPPED VEHICLE IN LANE CLOSER TO CENTER LINE<br>· THERE ARE FOLLOWING VEHICLES |
| CONGESTION CAUSE | SHORT-PERIOD LEFT-TURN SIGNAL |

| | |
|---|---|
| TRAFFIC OBSTACLE | · THERE ARE PEDESTRIANS CROSSING ROAD<br>· THERE IS STOPPED VEHICLE IN LANE FAR FROM CENTER LINE<br>· THERE ARE VEHICLES FOLLOWING STOPPED VEHICLE |
| CONGESTION CAUSE | WAITING FOR RIGHT TURN DUE TO PRESENCE OF MANY PEDESTRIANS |

| | |
|---|---|
| TRAFFIC OBSTACLE | · THERE IS STOPPED VEHICLE ON ROAD CROSSING IN INTERSECTION |
| CONGESTION CAUSE | BLOCKAGE OF INTERSECTION WHEN ROAD IS CROWDED |

| | |
|---|---|
| TRAFFIC OBSTACLE | · THERE ARE STOPPED VEHICLES IN LANE FAR FROM CENTER LINE<br>· PARKING PROHIBITED AREA<br>· THERE IS VEHICLE CHANGING LANES |
| CONGESTION CAUSE | ILLEGAL PARKING |

| | |
|---|---|
| TRAFFIC OBSTACLE | · THERE ARE STOPPED VEHICLES IN BUS STOP AREA<br>· BUS STOPS IN LANE OTHER THAN BUS STOP AREA |
| CONGESTION CAUSE | ILLEGAL PARKING IN BUS STOP AREA |

COUNTERMEASURE INFORMATION

| CONGESTION CAUSE | COUNTERMEASURES |
|---|---|
| TRAFFIC ACCIDENT | DISPATCHING ON-SITE POLICE OFFICER |
| DISABLED VEHICLE | DISPATCHING ON-SITE POLICE OFFICER |
| FALLING OBJECT | DISPATCHING ON-SITE POLICE OFFICER |
| SHORT-PERIOD LEFT-TURN SIGNAL | CHANGING SIGNAL LIGHTING INTERVALS AND DISPATCHING ON-SITE POLICE OFFICER |
| WAITING FOR RIGHT TURN DUE TO PRESENCE OF MANY PEDESTRIANS | CHANGING SIGNAL LIGHTING INTERVALS AND DISPATCHING ON-SITE POLICE OFFICER |
| BLOCKAGE OF INTERSECTION WHEN ROAD IS CROWDED | DISPATCHING ON-SITE POLICE OFFICER AND CHANGING SIGNAL LIGHTING INTERVALS |
| ILLEGAL PARKING | DISPATCHING ON-SITE POLICE OFFICER |
| ILLEGAL PARKING IN BUS STOP AREA | DISPATCHING ON-SITE POLICE OFFICER |

Fig. 17

| | | |
|---|---|---|
| RADIAL ROUTES | INBOUND DIRECTION | FOCUS DIRECTION IN MORNING (7 A.M. TO 9 A.M.) |
| | OUTBOUND DIRECTION | FOCUS DIRECTION IN EVENING (4 P.M. TO 7 P.M.) |
| CIRCLE ROUTES | FOCUS DIRECTION CONSTANTLY IN BOTH DIRECTIONS | |

Fig. 28

TRAFFIC MONITORING APPARATUS, TRAFFIC MONITORING SYSTEM, TRAFFIC MONITORING METHOD, AND NON-TRANSITORY COMPUTER READABLE MEDIUM STORING PROGRAM

CROSS-REFERENCE TO RELATED APPLICATIONS

This application is a national stage application of International Application No. PCT/JP2019/012813 titled "TRAFFIC MONITORING APPARATUS, TRAFFIC MONITORING SYSTEM, TRAFFIC MONITORING METHOD, AND NON-TRANSITORY COMPUTER READABLE MEDIUM STORING PROGRAM," filed on Mar. 26, 2019, which claims the benefit of the priority of Japanese Patent Application No. 2018-066014 filed on Mar. 29, 2018, the disclosures of each of which are hereby incorporated by reference in their entirety.

TECHNICAL FIELD

The present disclosure relates to a traffic monitoring apparatus, a traffic monitoring system, a traffic monitoring method, and a non-transitory computer readable medium storing a program.

BACKGROUND ART

In emerging countries etc., concentration of the population in urban areas has been rapidly occurring along with economic growth. However, traffic infrastructure such as roads, railroads, buses and the like has not been sufficiently developed, which causes serious traffic congestion due to a rapid increase in a traffic amount. In order to deal with the above situation, there is a technique of managing actual traffic situations in a road network by a traffic control apparatus installed in a traffic control center and implementing traffic measures such as controlling signal lights installed in an intersection and sending a notification of traffic situations indicating congestion, traffic regulations or the like to drivers.

With regard to the above technique, Patent Literature 1 discloses an image-capturing system provided in an intersection. The image-capturing system according to this Patent Literature includes an overall view image-capturing unit, a tracking target specifying unit, a plurality of specific target image-capturing units, and a voice information output unit. The overall view image-capturing unit captures images of a plurality of targets that travel in an intersection and in the vicinity of the intersection. The tracking target specifying unit specifies a target to be tracked from the data captured by the overall view image-capturing unit based on predetermined conditions. The plurality of specific target image-capturing units include image-pickup elements whose image resolution is higher than that of the image-pickup elements of the overall view image-capturing unit and capture images of the target to be tracked while tracking it. The voice information output unit outputs voice information with directivity for the target to be tracked.

Further, Patent Literature 2 discloses a traffic control apparatus. The traffic control apparatus according to Patent Literature 2 stores a transition with time of a traffic situation in a target road network in a traffic situation storage unit. The traffic control apparatus according to Patent Literature 2 estimates, from the transition with time of the traffic situation, a site where a chronic traffic problem such as congestion is occurring and generates measures for eliminating the traffic problem for the estimated site. After executing the above measures, the traffic control apparatus verifies the adequacy of the measures using the actual traffic situations and uses the results of the verification as know-how when following measures are generated.

Further, Patent Literature 3 discloses a traffic system for estimating a traffic path where congestion is occurring. The traffic system disclosed in Patent Literature 3 includes traffic network data which describes connection relations between traffic paths. This traffic system specifies another traffic path connected to a traffic path that is determined to be congested based on the traffic network data, determines whether or not congestion is occurring in the other traffic path, and records the results of the determination in a congestion list along with the connection relation.

CITATION LIST

Patent Literature

[Patent Literature 1] Japanese Unexamined Patent Application Publication No. 2011-043943
[Patent Literature 2] Japanese Unexamined Patent Application Publication No. 2005-267269
[Patent Literature 3] Japanese Unexamined Patent Application Publication No. 2015-028675

SUMMARY OF INVENTION

Technical Problem

In order to deal with the problem of traffic congestion, it is required to specify the cause of the congestion. Congestion often occurs in the vicinity of intersections where a plurality of roads intersect with each other. It is therefore required to monitor the travelling states of the vehicles in the intersections. It is possible that continuous congestion, which is congestion that occurs across a plurality of consecutive intersections, may occur widely in a number of places of a road network around an urban area. As described above, when a plurality of continuous congestions are occurring in a wide area, if there are limitations in regard to human resources such as on-site police officers who deal with congestion, physical resources such as security vehicles and the like, it is difficult to allocate the limited physical and human resources to all the congestion occurring places. It is therefore required to appropriately determine which one of the plurality of continuous congestions should be preferentially dealt with. However, none of the aforementioned Patent Literature discloses appropriately determining which one of the plurality of continuous congestions should be preferentially dealt with.

The present disclosure has been made in order to solve the aforementioned problem and an object of the present disclosure is to provide a traffic monitoring apparatus, a traffic monitoring system, a traffic monitoring method, and a program capable of efficiently eliminating congestion in an entire city by efficiently using limited physical and human resources.

Solution to Problem

A traffic monitoring apparatus according to the present disclosure includes: vehicle information acquisition means for acquiring vehicle information regarding travelling states of vehicles that are present in the vicinity of a plurality of respective intersections; congestion determination means for determining, for each of the plurality of intersections, whether or not congestion is occurring based on the vehicle information and determining an intersection where the congestion has occurred to be a congested intersection; and priority calculation means for calculating, for each of a plurality of continuous congestion paths including a plurality of consecutive congested intersections, a priority level for implementing measures to eliminate congestion based on at least a vehicle travelling direction in the continuous congestion path.

Further, a traffic monitoring system according to the present disclosure includes: a plurality of detection apparatuses configured to detect states of areas in the vicinity of a plurality of respective intersections; and a traffic monitoring apparatus configured to monitor traffic of the intersection, in which the traffic monitoring apparatus includes: vehicle information acquisition means for acquiring vehicle information regarding travelling states of vehicles that are present in the vicinity of the plurality of respective intersections; congestion determination means for determining, for each of the plurality of intersections, whether or not congestion is occurring based on the vehicle information and determining an intersection where the congestion has occurred to be a congested intersection; and priority calculation means for calculating, for each of a plurality of continuous congestion paths including a plurality of consecutive congested intersections, a priority level for implementing measures to eliminate congestion based on at least a vehicle travelling direction in the continuous congestion path.

Further, a traffic monitoring method according to the present disclosure includes: acquiring vehicle information regarding travelling states of vehicles that are present in the vicinity of a plurality of respective intersections; determining, for each of the plurality of intersections, whether or not congestion is occurring based on the vehicle information and determining an intersection where the congestion has occurred to be a congested intersection; and calculating, for each of a plurality of continuous congestion paths including a plurality of consecutive congested intersections, a priority level for implementing measures to eliminate congestion based on at least a vehicle travelling direction in the continuous congestion path.

Further, a program according to the present disclosure causes a computer to execute the following steps of: acquiring vehicle information regarding travelling states of vehicles that are present in the vicinity of a plurality of respective intersections; determining, for each of the plurality of intersections, whether or not congestion is occurring based on the vehicle information and determining an intersection where the congestion has occurred to be a congested intersection; and calculating, for each of a plurality of continuous congestion paths including a plurality of consecutive congested intersections, a priority level for implementing measures to eliminate congestion based on at least a vehicle travelling direction in the continuous congestion path.

Advantageous Effects of Invention

According to the present disclosure, it is possible to provide a traffic monitoring apparatus, a traffic monitoring system, a traffic monitoring method, and a program efficiently eliminating congestion in an entire city by efficiently using limited physical and human resources.

BRIEF DESCRIPTION OF DRAWINGS

FIG. 17 is a diagram illustrating countermeasure information according to the first example embodiment;

FIG. 28 is a diagram illustrating focus directions set by a focus direction setting unit according to the third example embodiment.

DESCRIPTION OF EMBODIMENTS (Outline of First Example Embodiment)

Figure 1:
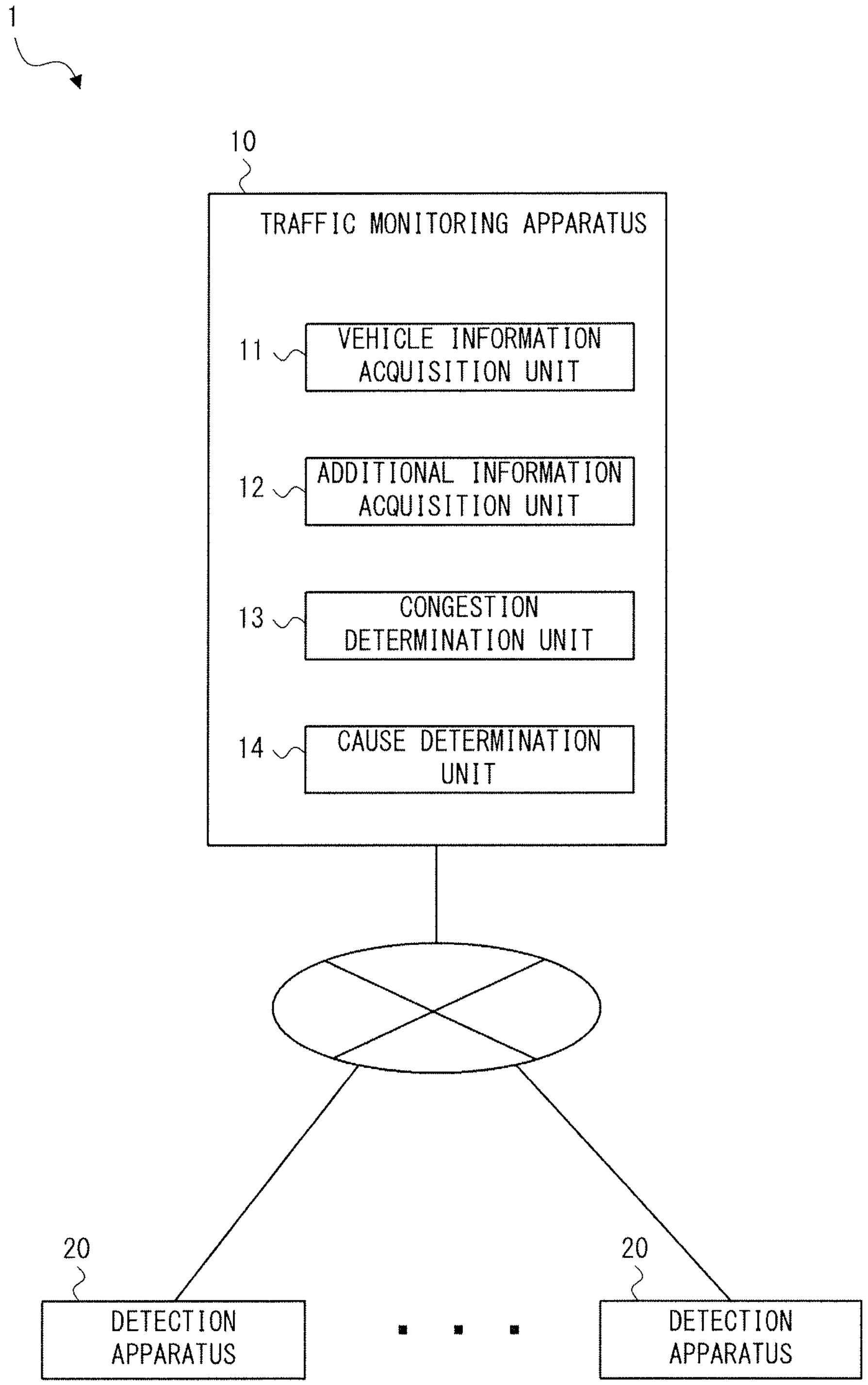
FIG. 1 is a diagram showing an outline of a traffic monitoring system according to a first example embodiment of the present disclosure.

Prior to giving a description of a first example embodiment of the present disclosure, an outline of the first example embodiment according to the present disclosure will be described. FIG. 1 is a diagram showing the outline of a traffic monitoring system 1 according to the first example embodiment of the present disclosure. The traffic monitoring system 1 includes a traffic monitoring apparatus 10 and at least one detection apparatus 20. The detection apparatus 20 and the traffic monitoring apparatus 10 are connected to each other in such a way that they can communicate with each other via a wired or wireless network.

The detection apparatus 20 is, for example, a camera, a sensor or the like. The detection apparatus 20 detects a state of an area in the vicinity of an intersection and transmits data indicating the results of the detection to the traffic monitoring apparatus 10. When the detection apparatus 20 is a camera, the detection apparatus 20 transmits images (image data) obtained by capturing images of surroundings of the intersection to the traffic monitoring apparatus 10. In the following description, the term “image” may also indicate “image data indicating images”, which is a processing target in information processing. Further, the images may either be still images or moving images.

The traffic monitoring apparatus 10 monitors the traffic of at least one intersection where the detection apparatus 20 is installed. The traffic monitoring apparatus 10 includes a vehicle information acquisition unit 11 (vehicle information acquisition means), an additional information acquisition unit 12 (additional information acquisition means), a congestion determination unit 13 (congestion determination means), and a cause determination unit 14 (cause determination means). The vehicle information acquisition unit 11 acquires vehicle information regarding the travelling states of vehicles that are present in the vicinity of the intersection from the data received from the detection apparatus 20. The additional information acquisition unit 12 acquires additional information regarding objects that are other than the travelling vehicles and are present in the vicinity of the intersection. The congestion determination unit 13 determines, for each of a plurality of lanes of a road crossing the intersection, whether congestion is occurring based on the vehicle information. The cause determination unit 14 determines the cause of the congestion in the lane which has been determined to be congested based on at least the additional information.

As described above, the traffic monitoring apparatus 10 according to the first example embodiment of the present disclosure determines, for each of a plurality of lanes of a road crossing the intersection, whether or not congestion is occurring and determines the cause of the congestion in the lane which has been determined to be congested. Therefore, the traffic monitoring system 1 according to the first example embodiment of the present disclosure is able to determine the cause of the congestion more definitely. Therefore, it becomes possible to examine countermeasures against congestion more appropriately. By using the traffic monitoring system 1 according to the first example embodiment of the present disclosure as well, it becomes possible to determine the cause of the congestion more definitely. Further, by using a traffic monitoring method executed in the traffic monitoring apparatus 10 according to the first example embodiment of the present disclosure and a program that executes the traffic monitoring method as well, it becomes possible to determine the cause of the congestion more definitely.

First Example Embodiment

Hereinafter, with reference to the drawings, example embodiments will be described. For the sake of clarification of the description, the following description and the drawings are omitted and simplified as appropriate. Throughout the drawings, the same elements are denoted by the same reference symbols and overlapping descriptions are omitted as appropriate.

Figure 2:
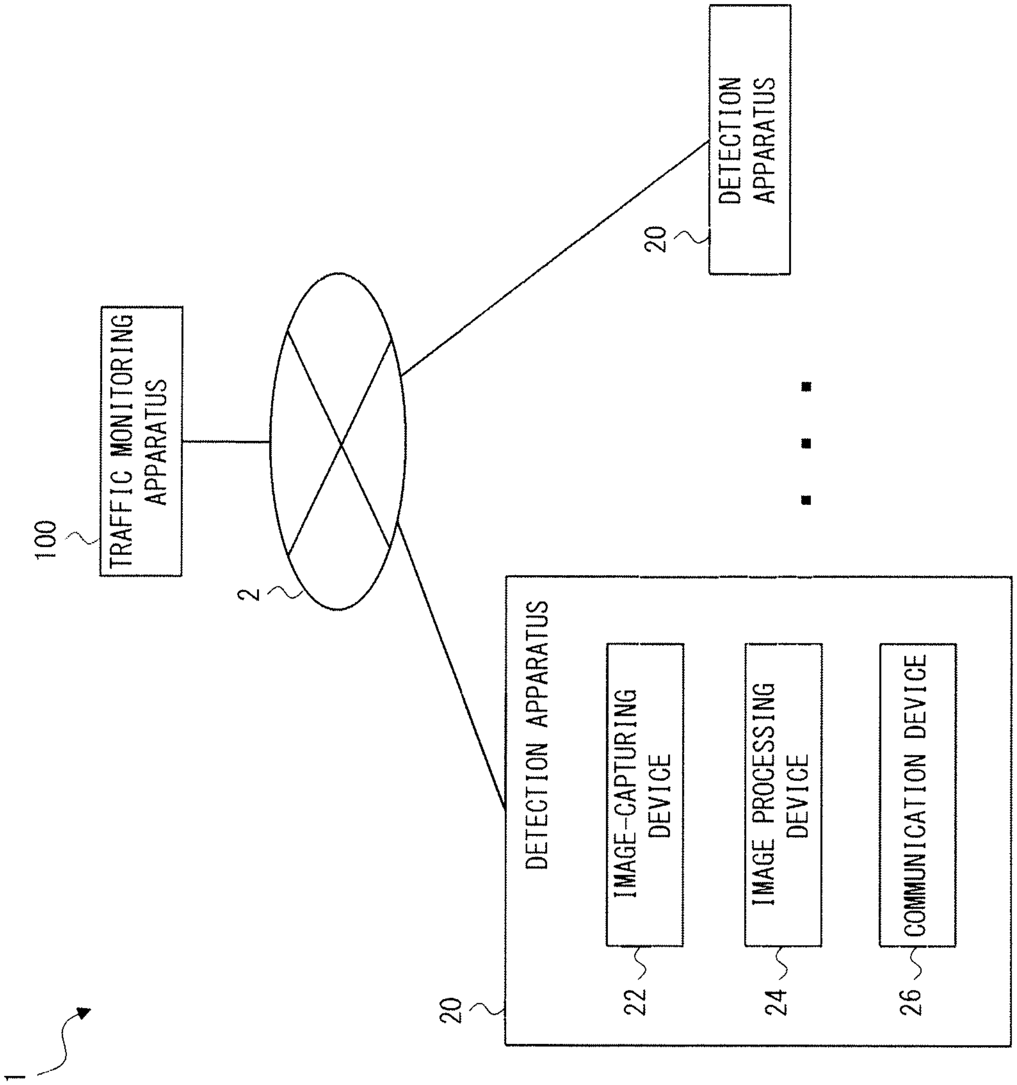
FIG. 2 is a diagram showing the traffic monitoring system according to the first example embodiment.

FIG. 2 is a diagram showing a traffic monitoring system 1 according to a first example embodiment. The traffic monitoring system 1 is formed of a plurality of detection apparatuses 20 and a traffic monitoring apparatus 100. The traffic monitoring apparatus 100 corresponds to the traffic monitoring apparatus 10 shown in FIG. 1. Each of the plurality of detection apparatuses 20 and the traffic monitoring apparatus 100 are connected to each other in such a way that they can communicate with each other via a wired or wireless network 2. The detection apparatus 20 may be installed in the vicinity of an intersection.

As described above, the detection apparatus 20 is, for example, a camera, a sensor or the like. In the following description, a case in which the detection apparatus 20 is a camera (monitoring camera) is shown. The detection apparatus 20 transmits images obtained by capturing images of the state of an area in the vicinity of the intersection (intersection images) to the traffic monitoring apparatus 100. The detection apparatus 20 includes an image-capturing device 22, an image processing device 24, and a communication device 26. The image-capturing device 22 is, for example, a camera body. The image-capturing device 22 may be a fixed camera, a PTZ (Pan/Tilt/Zoom) camera, or may include both of them. The image-capturing device 22 captures images of an area in the vicinity of the intersection in which the detection apparatus 20 is installed.

The image processing device 24 performs necessary image processing on the intersection images captured by the image-capturing device 22. The communication device 26 may include a router and the like. The communication device 26 transmits the intersection images on which image processing has been performed by the image processing device 24 to the traffic monitoring apparatus 100 via the network 2. In this case, the communication device 26 transmits identification information regarding the detection apparatus 20 or the intersection where the detection apparatus 20 is installed in association with the intersection images to the traffic monitoring apparatus 100. Accordingly, the traffic monitoring apparatus 100 is able to determine regarding which intersection the received intersection images relate to.

The traffic monitoring apparatus 100 monitors traffic of a plurality of intersections where the detection apparatuses 20 are installed. The traffic monitoring apparatus 100, which is installed in a traffic control center or the like, is used by an operator who monitors the traffic. The traffic monitoring apparatus 100 determines the cause of the congestion using the image data (intersection images) transmitted from each of the detection apparatuses 20 and presents a countermeasure method against congestion.

Figure 3:
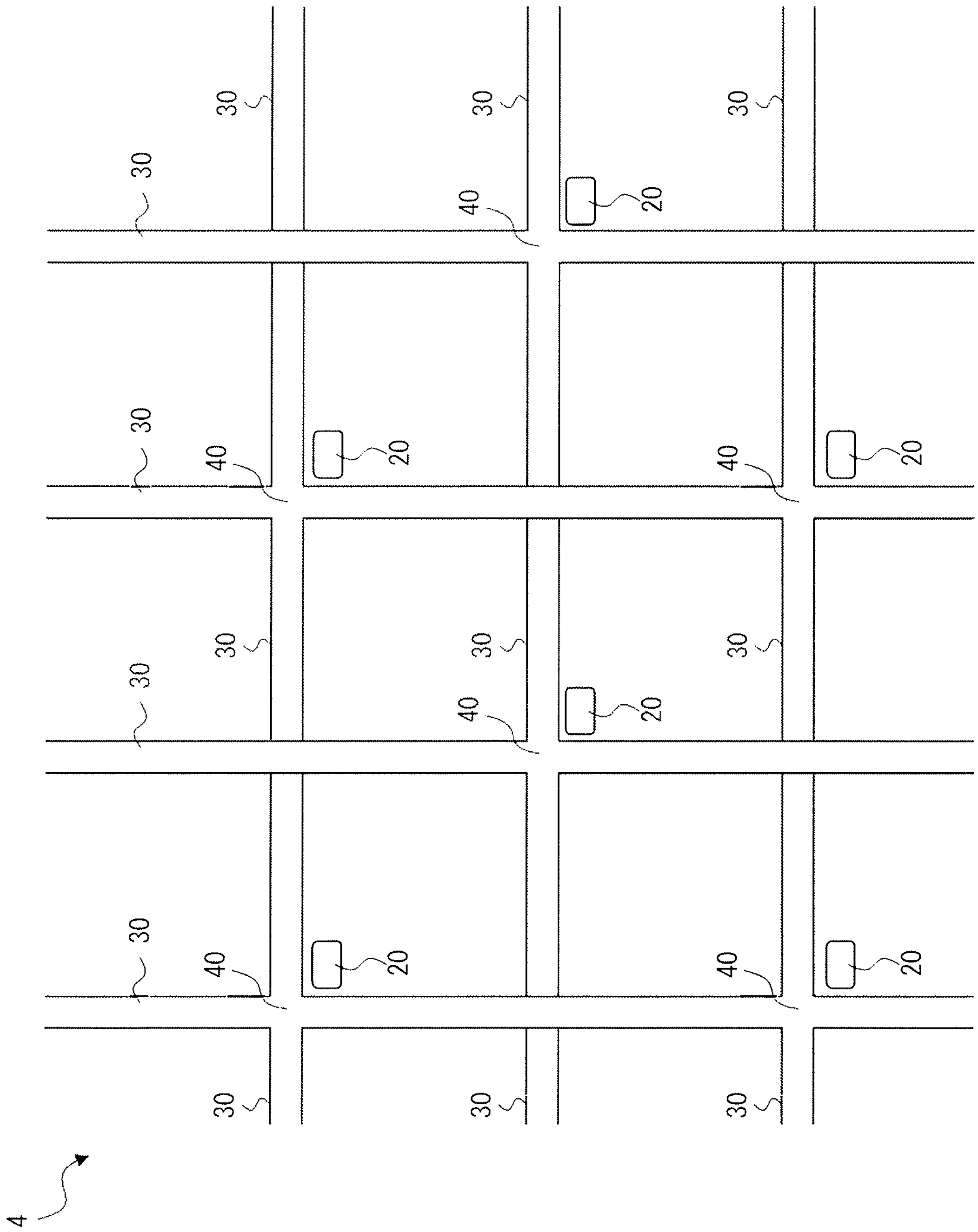
FIG. 3 is a diagram illustrating a plurality of intersections where detection apparatuses according to the first example embodiment are installed.

FIG. 3 is a diagram illustrating a plurality of intersections where the detection apparatuses 20 according to the first example embodiment are installed. As illustrated in FIG. 3, a plurality of roads 30 intersect with each other at a plurality of intersections 40 in a road network 4. That is, the plurality of roads 30 intersect with each other, whereby the intersections 40 are formed. Then the detection apparatuses 20 are installed in the vicinity of the respective intersections 40. The traffic monitoring apparatus 100 monitors traffic for each of the plurality of intersections 40 using the intersection images and the identification information associated with the intersection images.

Figure 4:
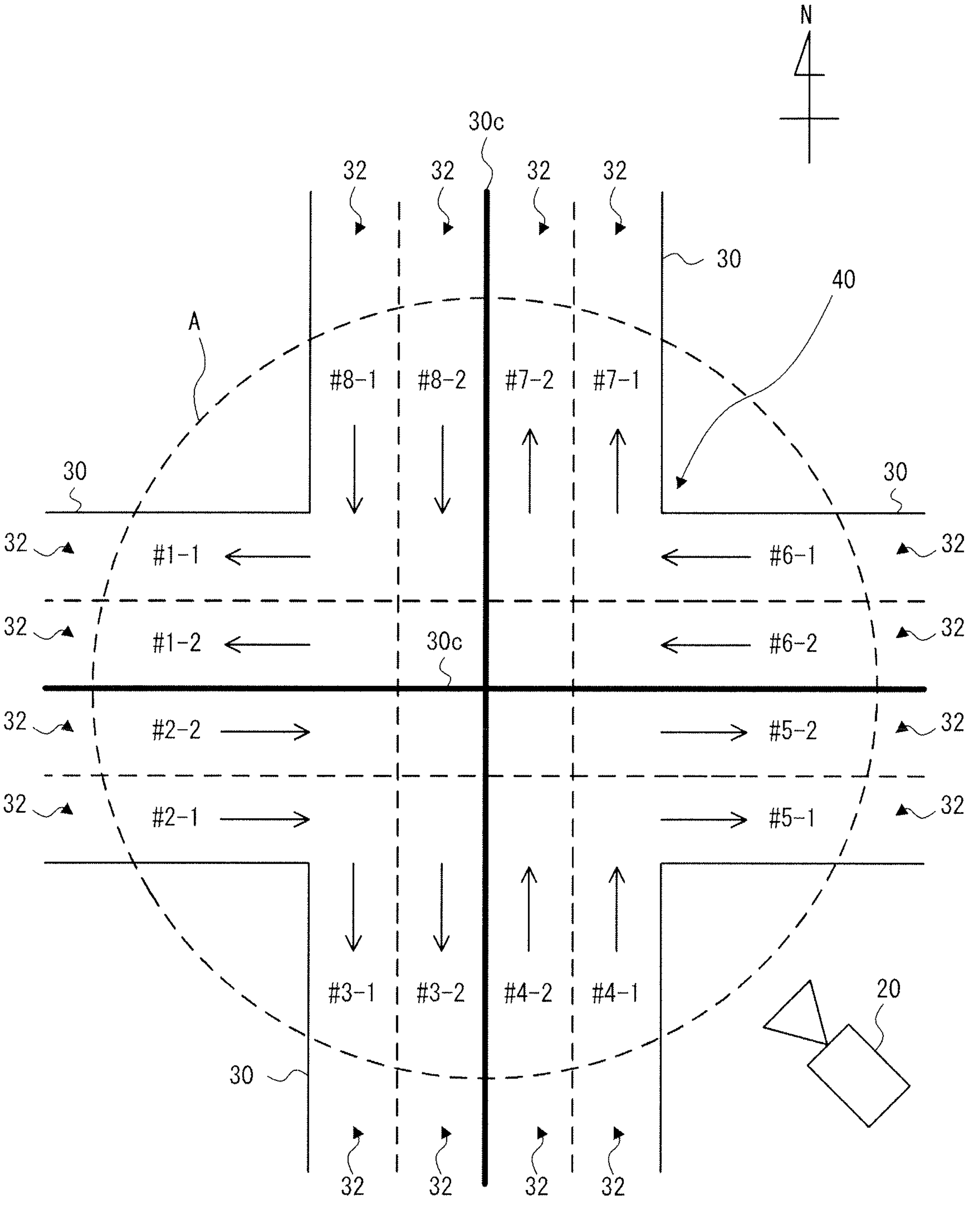
FIG. 4 is a diagram illustrating intersections where the detection apparatuses according to the first example embodiment are installed.

FIG. 4 is a diagram illustrating the intersection 40 where the detection apparatus 20 according to the first example embodiment is installed. While the intersection 40, which is a crossroad (a junction of four roads), is shown in FIG. 4, the intersection 40 is not limited to a crossroad. The intersection 40 may be a junction of three roads or may be a junction of multiple roads such as a junction of five roads, or may be a rotary intersection. The detection apparatus 20 may capture images of a range (range A) indicated by a broken circle A.

Each of the roads 30 includes a plurality of lanes 32. FIG. 4 shows an example in which the roads 30 each having two lanes 32 on one side with respect to a center line 30*c* of the road 30 (i.e., four back-and-forth lanes) intersect with each other in the intersection 40. However, the number of lanes 32 included in one road 30 may be any number equal to or greater than two. Further, while an example of right-hand traffic in which vehicles travel on the right side is shown in this example embodiment, the traffic may be left-hand traffic. It is assumed in FIG. 4 that the right side of the intersection 40 is the east, the left side thereof is the west, the upper side thereof is the north, and the lower side thereof is the south. That is, one intersection 40 includes lanes 32 with eight vehicle travelling directions. The detection apparatus 20 constantly captures images of the lanes 32 in eight directions in the vicinity of the intersection 40. Then the traffic monitoring apparatus 100 constantly monitors, for each of the intersections 40, the lanes 32 in the eight directions in the vicinity of the intersection 40.

Further, the lanes 32 through which vehicles travel from the intersection 40 to the west are denoted by lanes #1-1 and #1-2. The lane 32 that is far from the center line 30*c* is denoted by the lane #1-1 and the lane 32 that is closer to the center line 30*c* is denoted by the lane #1-2. The lanes 32 through which vehicles travel from the west to the intersection 40 are denoted by lanes #2-1 and #2-2. The lane 32 that is far from the center line 30*c* is denoted by the lane #2-1 and the lane 32 that is closer to the center line 30*c* is denoted by the lane #2-2. The lanes 32 through which vehicles travel from the intersection 40 to the south are denoted by lanes #3-1 and #3-2. The lane 32 that is far from the center line 30*c* is denoted by the lane #3-1 and the lane 32 that is closer to the center line 30*c* is denoted by the lane #3-2. The lanes 32 through which vehicles travel from the south to the intersection 40 are denoted by lanes #4-1 and #4-2. The lane 32 that is far from the center line 30*c* is denoted by the lane #4-1 and the lane 32 that is closer to the center line 30*c* is denoted by the lane #4-2.

Further, the lanes 32 through which vehicles travel from the intersection 40 to the east are denoted by lanes #5-1 and #5-2. The lane 32 that is far from the center line 30*c* is denoted by the lane #5-1 and the lane 32 that is closer to the center line 30*c* is denoted by the lane #5-2. The lanes 32 through which vehicles travel from the east to the intersection 40 are denoted by lanes #6-1 and #6-2. The lane 32 that is far from the center line 30*c* is denoted by the lane #6-1 and the lane 32 that is closer to the center line 30*c* is denoted by the lane #6-2. The lanes 32 through which vehicles travel from the intersection 40 to the north are denoted by lanes #7-1 and #7-2. The lane 32 that is far from the center line 30*c* is denoted by the lane #7-1 and the lane 32 that is closer to the center line 30*c* is denoted by the lane #7-2. The lanes 32 through which vehicles travel from the north to the intersection 40 are denoted by lanes #8-1 and #8-2. The lane 32 that is far from the center line 30*c* is denoted by the lane #8-1 and the lane 32 that is closer to the center line 30*c* is denoted by the lane #8-2. As described above, a total of 16 lanes 32 intersect in the intersection 40.

Figure 5:
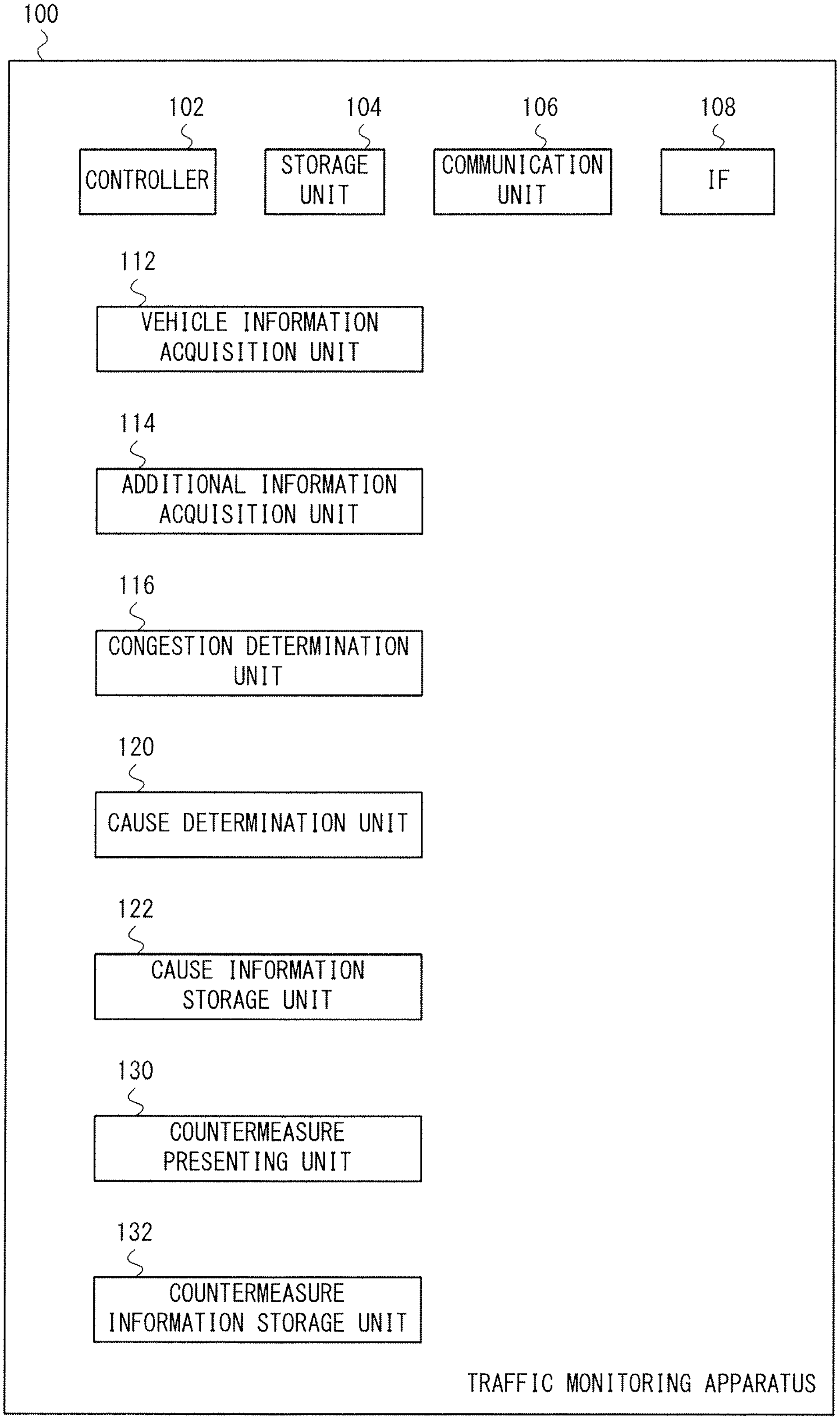
FIG. 5 is a diagram showing a configuration of a traffic monitoring apparatus according to the first example embodiment.

FIG. 5 is a diagram showing a configuration of the traffic monitoring apparatus 100 according to the first example embodiment. The traffic monitoring apparatus 100 includes, as a main hardware configuration, a controller 102, a storage unit 104, a communication unit 106, and an interface unit 108 (IF; Interface). The controller 102, the storage unit 104, the communication unit 106, and the interface unit 108 are connected to one another via a data bus or the like.

The controller 102 is, for example, a processor such as a Central Processing Unit (CPU). The controller 102 has a function as an arithmetic device that performs control processing, arithmetic processing and the like. The storage unit 104 is, for example, a storage device such as a memory, a hard disc or the like. The storage unit 104 is, for example, a Read Only Memory (ROM), a Random Access Memory (RAM) or the like. The storage unit 104 has a function of storing a control program, an arithmetic program and the like executed by the controller 102. Further, the storage unit 104 has a function of temporarily storing processing data or the like. The storage unit 104 may include a database.

The communication unit 106 performs processing that is necessary to perform communication with the detection apparatus 20 (and another apparatus) via the network 2. The communication unit 106 may include a communication port, a router, a firewall and the like. The interface unit 108 (IF; Interface) is, for example, a user interface (UI). The interface unit 108 includes an input device such as a keyboard, a touch panel, a mouse or the like and an output device such as a display, a speaker or the like. The interface unit 108 accepts a data input operation by a user (operator) and outputs information to the user. The interface unit 108 may display images received from the detection apparatus 20 (intersection images), a map indicating a place where congestion has occurred, the cause of the congestion, a countermeasure method and the like.

Further, the traffic monitoring apparatus 100 includes a vehicle information acquisition unit 112, an additional information acquisition unit 114, a congestion determination unit 116, a cause determination unit 120, a cause information storage unit 122, a countermeasure presenting unit 130, and a countermeasure information storage unit 132 (hereinafter each of them is referred to as "each of the components"). The vehicle information acquisition unit 112, the additional information acquisition unit 114, the congestion determination unit 116, and the cause determination unit 120 respectively serve as vehicle information acquisition means, additional information acquisition means, congestion determination means, and cause determination means. Further, the cause information storage unit 122, the countermeasure presenting unit 130, and the countermeasure information storage unit 132 respectively serve as cause information storage means, countermeasure presenting means, and countermeasure information storage means.

Each of the components may be provided, for example, by executing a program under a control by the controller 102. More specifically, each of the components may be provided by the controller 102 executing the program stored in the storage unit 104. Further, each of the components may be provided by storing a necessary program in a desired non-volatile storage medium and installing it as necessary. Further, each of the components is not limited to being implemented by software by a program and may be implemented by, for example, any combination of hardware, firmware, and software. Further, each of the components may be provided, for example, by using a user programmable integrated circuit such as a field-programmable gate array (FPGA) or a microcomputer. In this case, a program formed of each of the aforementioned components may be provided using the above integrated circuit. The same is applicable to other example embodiments that will be described later. The specific functions of the respective components will be described later.

The vehicle information acquisition unit 112 corresponds to the vehicle information acquisition unit 11 shown in FIG. 1. The vehicle information acquisition unit 112 acquires vehicle information regarding travelling states of vehicles that are present in the vicinity of the intersection 40 from the image data received from the detection apparatus 20 by image recognition or the like. In this case, the vehicle information acquisition unit 112 acquires the vehicle information for each of the plurality of lanes 32 crossing the intersection 40. The "vehicle information" here is information used to determine whether or not congestion is occurring in the vicinity of the intersection 40. The vehicle information is, for example, a traffic amount, an average travelling speed of the vehicle, an average waiting time of the vehicle within a predetermined range (range A in FIG. 4) of the intersection 40 or the like. The vehicle information may indicate the capacity (intersection capacity) indicating the number of vehicles 50 that the intersection 40 allows to pass.

The additional information acquisition unit 114 corresponds to the additional information acquisition unit 12 shown in FIG. 1. The additional information acquisition unit 114 acquires additional information regarding objects that are other than the travelling vehicles and are present in the vicinity of the intersection 40. The "objects other than the travelling vehicles" include, for example, pedestrians and light vehicles (bicycles etc.) in the intersection 40, a blocking vehicle which blocks the intersection 40, a parked vehicle which is parked in the vicinity of the intersection 40, an accident vehicle which is stopped due to some trouble (a traffic accident, a failure etc.) in the vicinity of the intersection 40, a falling object and the like. The "objects other than the travelling vehicles" further include traffic lights installed in the intersection 40. The additional information, which is information other than the vehicle information, is used to determine the cause of the congestion.

The congestion determination unit 116 corresponds to the congestion determination unit 13 shown in FIG. 1. The congestion determination unit 116 determines, for each of the plurality of lanes 32 of the roads 30 that intersect with the intersection 40, whether congestion is occurring using the vehicle information. The place where congestion is occurring is referred to as a congestion occurring place.

The cause determination unit 120 corresponds to the cause determination unit 14 shown in FIG. 1. The cause determination unit 120 determines, for the lane 32 which has been determined to be congested, the cause of the congestion (congestion cause) using at least the additional information. The cause information storage unit 122 stores congestion cause information, which is a database indicating candidates for the congestion cause. In the congestion cause information, a traffic obstacle indicated by the additional information etc. and the congestion cause are associated with each other.

The cause determination unit 120 may determine whether or not the congestion occurring place is a congestion induced place where congestion has been induced and determine the congestion cause for the congestion induced place. The "congestion induced place" here means a place where congestion has occurred due to some cause occurred in this place. In other words, the cause of the congestion occurred in a place where congestion has occurred although it is not the congestion induced place is that congestion has spread due to congestion occurred in another place (congestion induced place). As described above, by taking countermeasures for the congestion induced place by determining the cause of the congestion for the congestion induced place, it is possible that congestion may be eliminated in the other congestion occurring place as well. Therefore, in the first example embodiment, it is possible to efficiently eliminate congestion.

Further, the countermeasure information storage unit 132 stores countermeasure information. In the countermeasure information, the congestion cause and the countermeasure method are associated with each other. Specific examples of the countermeasure information will be described later. The countermeasure presenting unit 130 presents the countermeasure method against the congestion cause using the countermeasure information. The countermeasure presenting unit 130 displays, for example, the countermeasure method on the interface unit 108. As described above, the countermeasure presenting unit 130 presents the countermeasure method against congestion to the user (operator), whereby it is possible to easily take countermeasures without depending on the operator's know-how.

Figure 6:
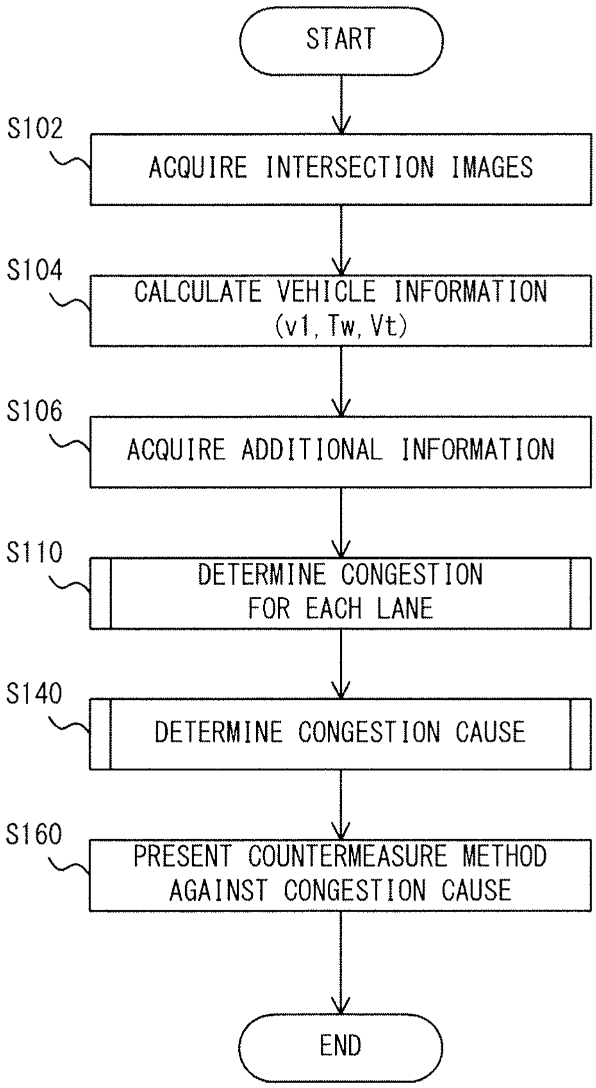
FIG. 6 is a flowchart showing a traffic monitoring method executed by the traffic monitoring apparatus according to the first example embodiment.

FIG. 6 is a flowchart showing a traffic monitoring method executed by the traffic monitoring apparatus 100 according to the first example embodiment. First, the traffic monitoring apparatus 100 acquires the intersection images from each of the plurality of detection apparatuses 20 (Step S102). Specifically, the communication unit 106 of the traffic monitoring apparatus 100 receives the intersection images from each of the detection apparatuses 20. Accordingly, the vehicle information acquisition unit 112 acquires the intersection images transmitted from each of the detection apparatuses 20.

Next, the vehicle information acquisition unit 112 calculates vehicle information regarding the intersection that corresponds to the intersection images using the intersection images and the identification information associated with the intersection images (Step S104). As described above, the vehicle information is, for example, an average travelling speed v1 of the vehicle, an average waiting time Tw of the vehicle, and a traffic amount Vt. Specifically, the vehicle information acquisition unit 112 performs image recognition on the intersection images and specifies the respective vehicles that travel on a plurality of lanes 32 connected to the intersection 40. Then the vehicle information acquisition unit 112 calculates the travelling speed and the waiting time for each vehicle. The travelling speed is a speed at which one vehicle passes one site of one lane 32 (e.g., in the vicinity of the boundary between the lane 32 and the intersection 40).

The waiting time is a staying time during which one vehicle stays in each lane 32 within a predetermined range (the range A in FIG. 4) of the intersection 40.

The vehicle information acquisition unit 112 calculates, for each lane 32, the travelling speed for each of vehicles that have passed within a predetermined period of time (e.g., 15 minutes) and averages them, thereby calculating the average travelling speed v1. In a similar way, the vehicle information acquisition unit 112 calculates, for each lane 32, the waiting time for each of the vehicles that have passed within a predetermined period of time (e.g., 15 minutes) and averages them, thereby calculating the average waiting time Tw. The vehicle information acquisition unit 112 further calculates, for each lane 32, the number of vehicles N that have passed one site (e.g., in the vicinity of the boundary between the lane 32 and the intersection 40) per unit time (e.g., 15 minutes), thereby calculating the traffic amount Vt. As described above, the vehicle information acquisition unit 112 acquires the vehicle information by performing image recognition on the intersection images, whereby it is possible to automatically perform the determination of the congestion.

Next, the additional information acquisition unit 114 acquires additional information using the intersection images and the identification information associated with the intersection images (Step S106). Specifically, the additional information acquisition unit 114 recognizes images of pedestrians, light vehicles and the like included in the intersection images and extracts these images by image processing. The additional information acquisition unit 114 further recognizes images of a blocking vehicle, a parked vehicle, an accident vehicle, a falling object or the like included in the intersection images and extracts these images by image processing. The additional information acquisition unit 114 further receives information regarding lighting intervals from the traffic lights installed in the intersection 40. As described above, the vehicle information acquisition unit 112 analyzes the images of the intersection images or receives information regarding the lighting intervals from the traffic lights, whereby it is possible to automatically determine the congestion cause.

Next, the congestion determination unit 116 determines whether or not congestion is occurring for each lane 32 of each intersection 40 (Step S110). Specifically, the congestion determination unit 116 determines, for each lane 32 of each intersection 40, whether or not congestion is occurring by a method illustrated in FIG. 7. Note that the method of determining the congestion is not limited to the example shown in FIG. 7.

Figure 7:
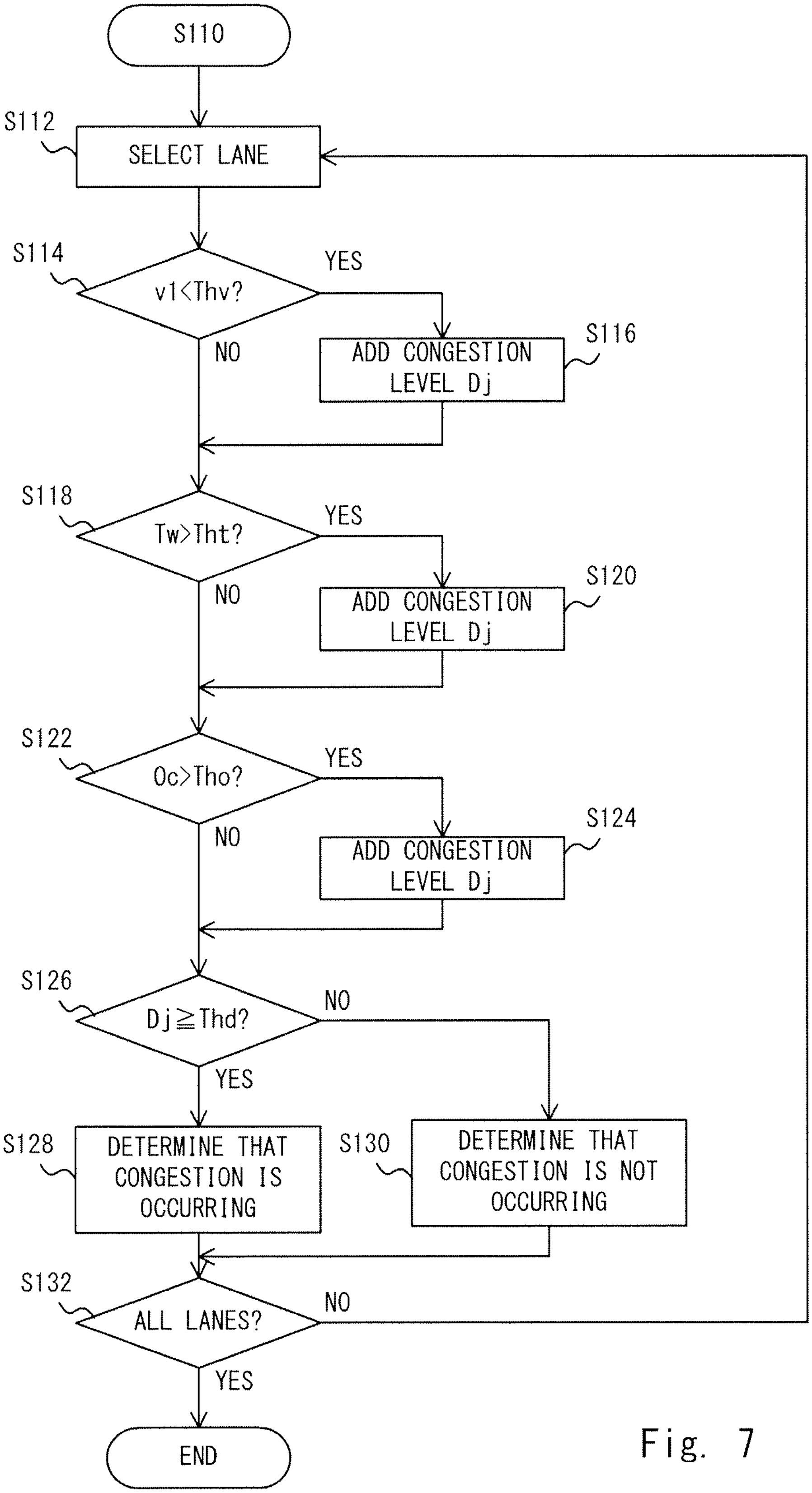
FIG. 7 is a diagram illustrating a congestion determination method performed by a congestion determination unit according to the first example embodiment.

FIG. 7 is a diagram illustrating a congestion determination method performed by the congestion determination unit 116 according to the first example embodiment. The congestion determination unit 116 performs the congestion determination method illustrated in FIG. 7 for each of the plurality of intersections 40 using the identification information added to the intersection images. First, the congestion determination unit 116 selects the lane 32 to be determined (e.g., the lane #1-1) (Step S112). The following processing is performed for the selected lane 32 in S114 to S130.

The congestion determination unit 116 determines whether or not the average travelling speed v1 is below a predetermined threshold Thv (Step S114). For example, Thv=20 km/h. When it is determined that the average travelling speed v1 is below the threshold Thv (YES in S114), the congestion determination unit 116 adds a congestion level Dj (Step S116). The added value may be set as appropriate depending on how much emphasis should be placed on the average travelling speed v1 when the congestion is determined.

The congestion level Dj is a parameter indicating the degree of the congestion. As congestion becomes severer, the congestion level Dj becomes larger. The initial value of the congestion level Dj is set to 0. The number of thresholds Thv is not limited to one and may be plural. In this case, the congestion level Dj may be added in stages as well. Assume a case in which, for example, Thv1=20 km/h, Thv2=10 km/h, and Thv3=5 km/h. In this case, the congestion level Dj may be incremented by "1" when 10≤v1<20 is satisfied. Further, the congestion level Dj may be incremented by "2" when 5≤v1<10 is satisfied. Further, the congestion level Dj may be incremented by "3" when v1<5 is satisfied.

Next, the congestion determination unit 116 determines whether or not the average waiting time Tw exceeds a predetermined threshold Tht (Step S118). It is assumed, for example, that Tht is 240 seconds. When it has been determined that the average waiting time Tw exceeds the threshold Tht (YES in S118), the congestion determination unit 116 adds the congestion level Dj (Step S120). The added value may be set as appropriate depending on how much emphasis should be placed on the average waiting time Tw when the congestion is determined.

The number of thresholds Tht is not limited to one and may be plural. In this case, the congestion level Dj may be added in stages as well. It is assumed, for example, that Tht1 is 240 seconds, Tht2 is 360 seconds, and Tht3 is 480 seconds. In this case, the congestion level Dj may be incremented by "1" when 240<Tw≤360 is satisfied. Further, the congestion level Dj may be incremented by "2" when 360<Tw≤480 is satisfied. Further, the congestion level Dj may be incremented by "3" when 480<Tw is satisfied.

Next, the congestion determination unit 116 determines whether or not an occupation rate Oc exceeds a predetermined threshold Tho (Step S122). It is assumed, for example, that Tho is 40%. When it has been determined that the occupation rate Oc exceeds the threshold Tho (YES in S122), the congestion determination unit 116 adds the congestion level Dj (Step S124). The added value may be set as appropriate depending on how much emphasis should be placed on the occupation rate Oc when the congestion is determined.

The occupation rate here is, for example, a time occupation rate, and indicates the rate of time during which a vehicle is present in the observation time (e.g., 15 minutes) in one site. The occupation rate Oc is indicated, for example, by the following Expression 1.

$$Oc = \sum_{i=1}^{n} \frac{t_i}{T} \times 100 = \frac{1}{T} \sum_{i=1}^{n} \frac{l_i}{v_i} \times 100 \qquad \text{(Expression 1)}$$

The symbol T denotes an observation time. Further, the symbol n denotes the number of vehicles (traffic amount) that have passed one site during an observation time T. Further, $t_i$ denotes a time during which the vehicle i has been present in one site. Further, $v_i$ denotes the speed at which the vehicle i passes. Further, $l_i$ denotes the length of the vehicle i.

Note that the number of thresholds Tho is not limited to one and may be plural. In this case, the congestion level Dj may be added in stages as well. It is assumed, for example, that Tho1 is 40%, Tho2 is 45%, and Tho3 is 50%. In this case, the congestion level Dj may be incremented by "1" when 40<Oc≤45 is satisfied. Further, the congestion level Dj may be incremented by "2" when 45<Oc≤50 is satisfied. Further, the congestion level Dj may be incremented by "3" when 50<Oc is satisfied.

Next, the congestion determination unit 116 determines whether or not the congestion level Dj is equal to or larger than the predetermined threshold Thd (Step S126). When the congestion level Dj is equal to or larger than the threshold Thd (YES in S126), the congestion determination unit 116 determines that congestion is occurring in this lane 32 (Step S128). On the other hand, when the congestion level Dj is not equal to or larger than the threshold Thd (NO in S126), the congestion determination unit 116 determines that congestion is not occurring in this lane 32 (Step S130).

The method of determining the threshold Thd is set as appropriate in accordance with criteria for determining congestion. When, for example, it is determined that there is congestion if all the determinations of S114, S122, and S126 are satisfied, it may be defined that 1 is added when each process is satisfied and Thd may be set to 3. Further, when it is determined that there is congestion if any one of the determinations of S114, S122, and S126 is satisfied, it may be defined that 1 is added when each process is satisfied and Thd may be set to 1.

Next, the congestion determination unit 116 determines whether or not congestion determination processing has been performed for all the lanes 32 (Step S132). When the congestion determination processing has not been performed for all the lanes 32 (NO in S132), the process goes back to the processing of S112. On the other hand, when the congestion determination processing has been performed for all the lanes 32 (YES in S132), the congestion determination unit 116 ends the processing for the intersection 40.

Next, the cause determination unit 120 determines, for each of the intersections 40, the congestion cause of the place where congestion is occurring (Step S140). Specifically, the cause determination unit 120 determines, for each of the intersections 40, the congestion cause by a method illustrated in FIG. 8. The method of determining the congestion cause is not limited to the example shown in FIG. 8.

Figure 8:
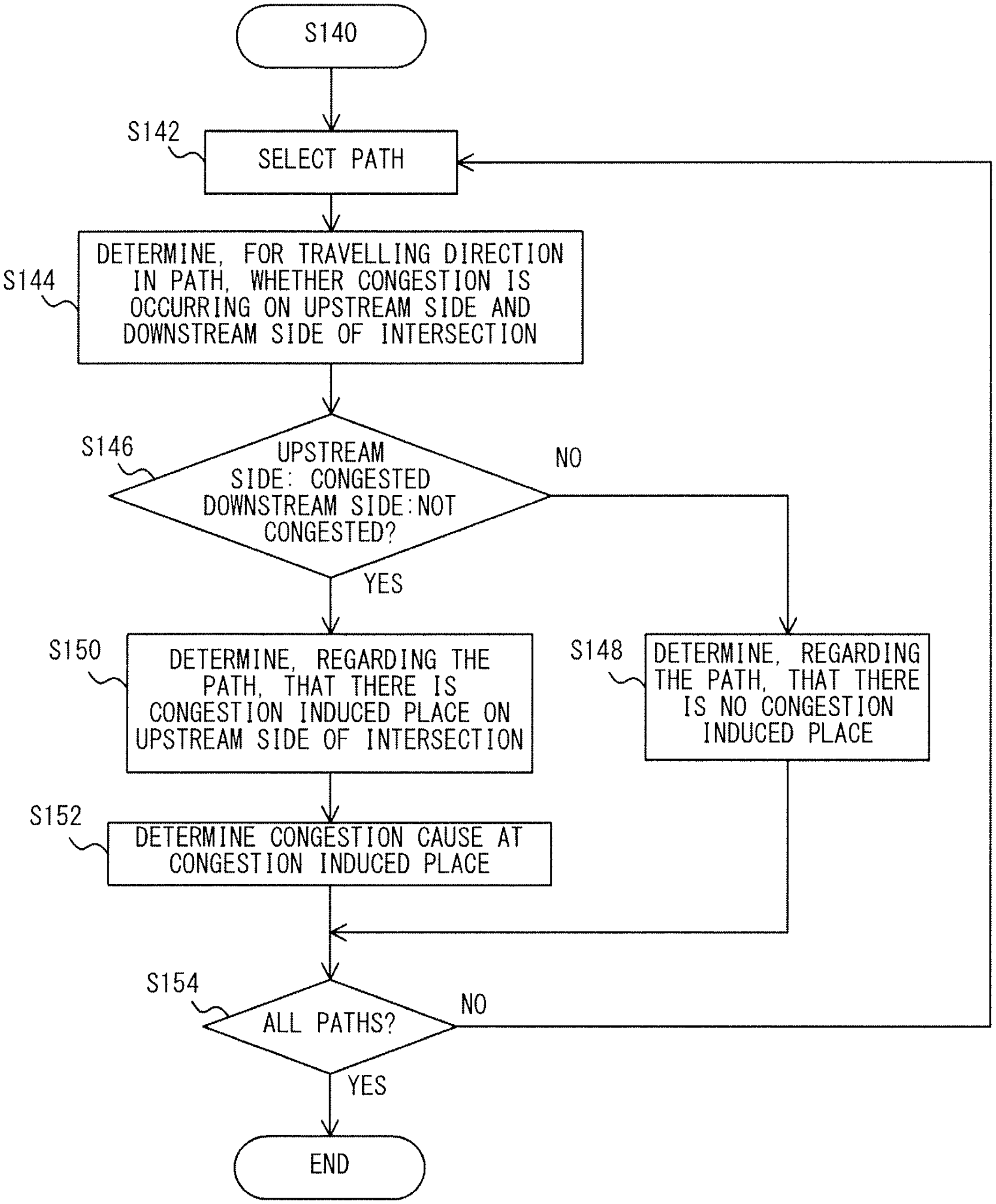
FIG. 8 is a diagram illustrating a cause determination method performed by a cause determination unit according to the first example embodiment.

FIG. 8 is a diagram illustrating a cause determination method performed by the cause determination unit 120 according to the first example embodiment. The cause determination unit 120 performs, for each of the plurality of intersections 40, the cause determination method illustrated in FIG. 8 using identification information added to the intersection images. In this case, the cause determination unit 120 determines whether or not the place (lane 32) where congestion is occurring is the congestion induced place where congestion has been induced, and determines the cause of the congestion for this congestion induced place.

First, the cause determination unit 120 selects, for the intersection 40 to be determined, one from all the paths including the place (lane 32) determined to be congested (Step S142). The "path" here includes not only a straight travelling path but also a right-turn path and a left-turn path that crosses the opposite lane.

Figure 9:
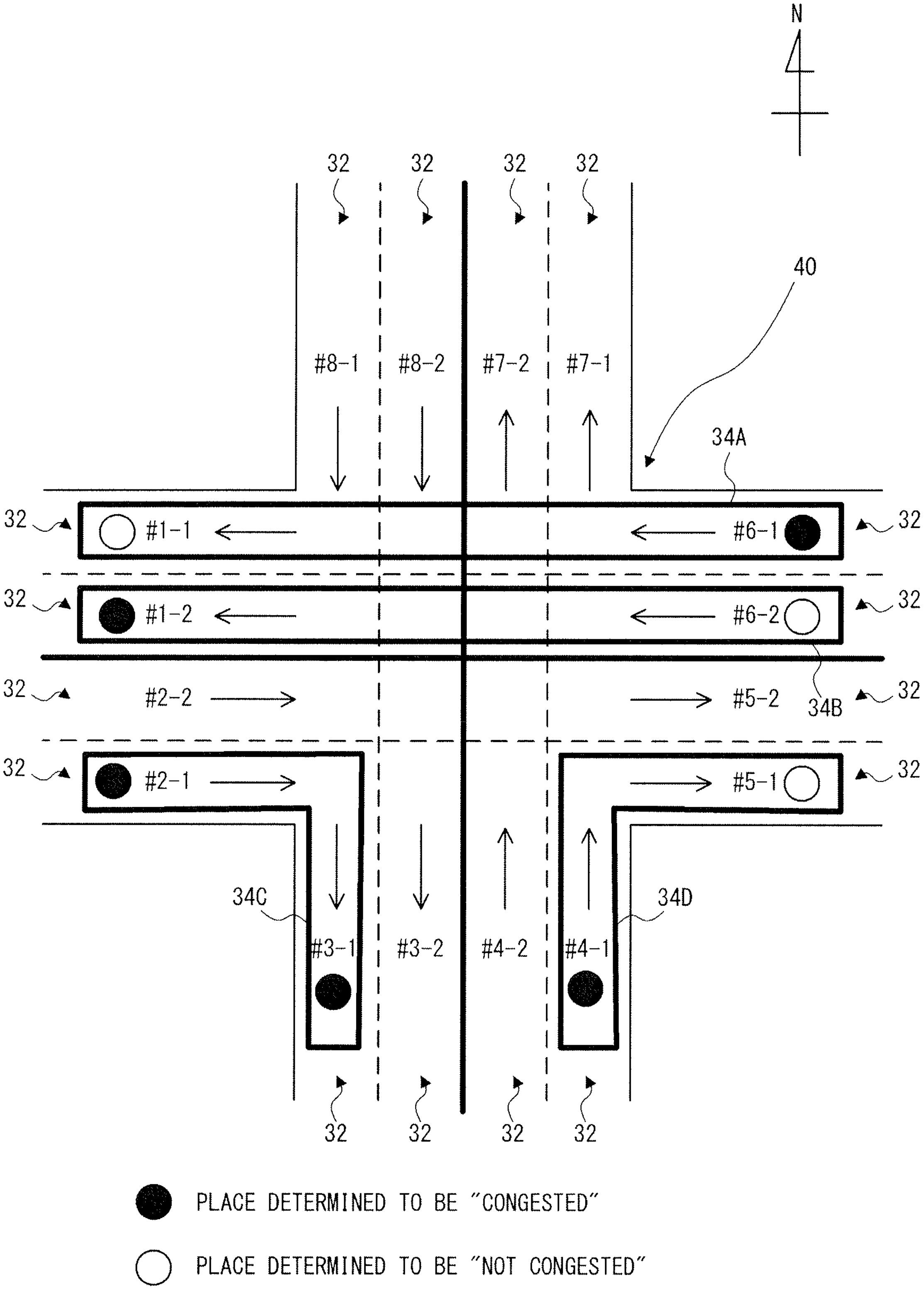
FIG. 9 is a diagram for describing a cause determination method according to the first example embodiment.

FIG. 9 is a diagram for describing the cause determination method according to the first example embodiment. FIG. 9 illustrates paths 34A to 34D. The path 34A is a straight travelling path from the lane #6-1 to the lane #1-1. That is, in the path 34A, the lane #6-1 is on the upstream side and the lane #1-1 is on the downstream side. The path 34B is a straight travelling path from the lane #6-2 to the lane #1-2. That is, in the path 34B, the lane #6-2 is on the upstream side and the lane #1-2 is on the downstream side. The path 34C is a right-turn path from the lane #2-1 to the lane #3-1. That is, in the path 34C, the lane #2-1 is on the upstream side and the lane #3-1 is on the downstream side. The path 34D is a right-turn path from the lane #4-1 to the lane #5-1. That is, in the path 34D, the lane #4-1 is on the upstream side and the lane #5-1 is on the downstream side.

Next, the cause determination unit 120 determines, for the travelling direction of vehicles in the selected path, whether or not congestion is occurring on the upstream side and the downstream side of the intersection 40 (Step S144). The cause determination unit 120 determines if congestion is occurring on the upstream side of the intersection 40 and determines if congestion is not occurring on the downstream side of the intersection 40 (Step S146).

When congestion is not occurring on the upstream side of the intersection 40 (NO in S146), the cause determination unit 120 determines, regarding this path, that there is no congestion induced place where congestion has been induced (Step S148). Further, when congestion is occurring on both the upstream side and the downstream side of the intersection 40 (NO in S146), the cause determination unit 120 determines, regarding this path, that there is no congestion induced place (Step S148). On the other hand, when congestion is occurring on the upstream side of the intersection 40 and congestion is not occurring on the downstream side of the intersection 40 (YES in S146), the cause determination unit 120 determines, regarding this path, that there is a congestion induced place where congestion has been induced on the upstream side of the intersection 40 (Step S150). The expression "there is no congestion induced place" means that, regarding the above path, the cause of the congestion has occurred in another intersection 40 on the downstream side, not in the vicinity of the intersection 40.

In the example shown in FIG. 9, in the path 34A, congestion occurs in the lane #6-1, which is on the upstream side of the intersection 40 and congestion is not occurring in the lane #1-1, which is on the downstream side thereof. Therefore, regarding the path 34A, the cause determination unit 120 determines that there is a congestion induced place in the lane #6-1, which is on the upstream side of the intersection 40. In the path 34B, congestion is not occurring in the lane #6-2, which is on the upstream side of the intersection 40, and congestion is occurring in the lane #1-2, which is on the downstream side thereof. Therefore, regarding the path 34B, the cause determination unit 120 determines that there is no congestion induced place in the vicinity of the intersection 40 and determines that there is a congestion induced place in the intersection 40 etc. which is beyond the path 34B (the westerly direction).

Further, in the path 34C, congestion is occurring in the lane #2-1, which is on the upstream side of the intersection 40 and congestion is occurring also in the lane #3-1, which is on the downstream side thereof. Therefore, regarding the path 34C, the cause determination unit 120 determines that there is no congestion induced place in the vicinity of the intersection 40 and determines that there is a congestion induced place in the intersection 40 etc. which is beyond the path 34C (the southerly direction). In the path 34D, congestion is occurring in the lane #4-1, which is on the upstream side of the intersection 40 and congestion is not occurring in the lane #5-1, which is on the downstream side thereof. Therefore, regarding the path 34D, the cause determination unit 120 determines that there is a congestion induced place in the lane #4-1, which is on the upstream side of the intersection 40.

By determining the congestion induced place like in the processing of S144 to S150, the traffic monitoring apparatus 100 according to the first example embodiment is able to determine whether or not the original cause of congestion has occurred in the vicinity of the intersection 40. Therefore, it is possible to prevent the waste of taking countermeasures against the intersection 40 when the original cause of congestion has not occurred in the vicinity of the intersection 40, i.e., when the original cause of congestion has occurred in another place. Therefore, the traffic monitoring apparatus 100 according to the first example embodiment is able to efficiently implement countermeasures against the congestion cause.

Next, the cause determination unit 120 determines the congestion cause at the congestion induced place using at least the additional information (Step S152). Specifically, the cause determination unit 120 recognizes behavior of objects and vehicles in the vicinity of the congestion induced place using at least the additional information obtained by performing image recognition processing on the intersection images. Then the cause determination unit 120 determines the congestion cause at the congestion induced place by referring to the congestion cause information stored in the cause information storage unit 122. As described above, by analyzing the intersection images and determining the congestion cause by image recognition, it becomes possible to automatically determine the congestion cause without depending on the operator's know-how.

Then the cause determination unit 120 determines whether or not the cause determination processing has been executed for all the paths 34 (Step S154). When the cause determination processing has not been executed for all the paths 34 (NO in S154), the process goes back to S142. On the other hand, when the cause determination processing has been performed for all the paths 34 (YES in S154), the cause determination unit 120 ends the processing for this intersection 40.

Figure 10:
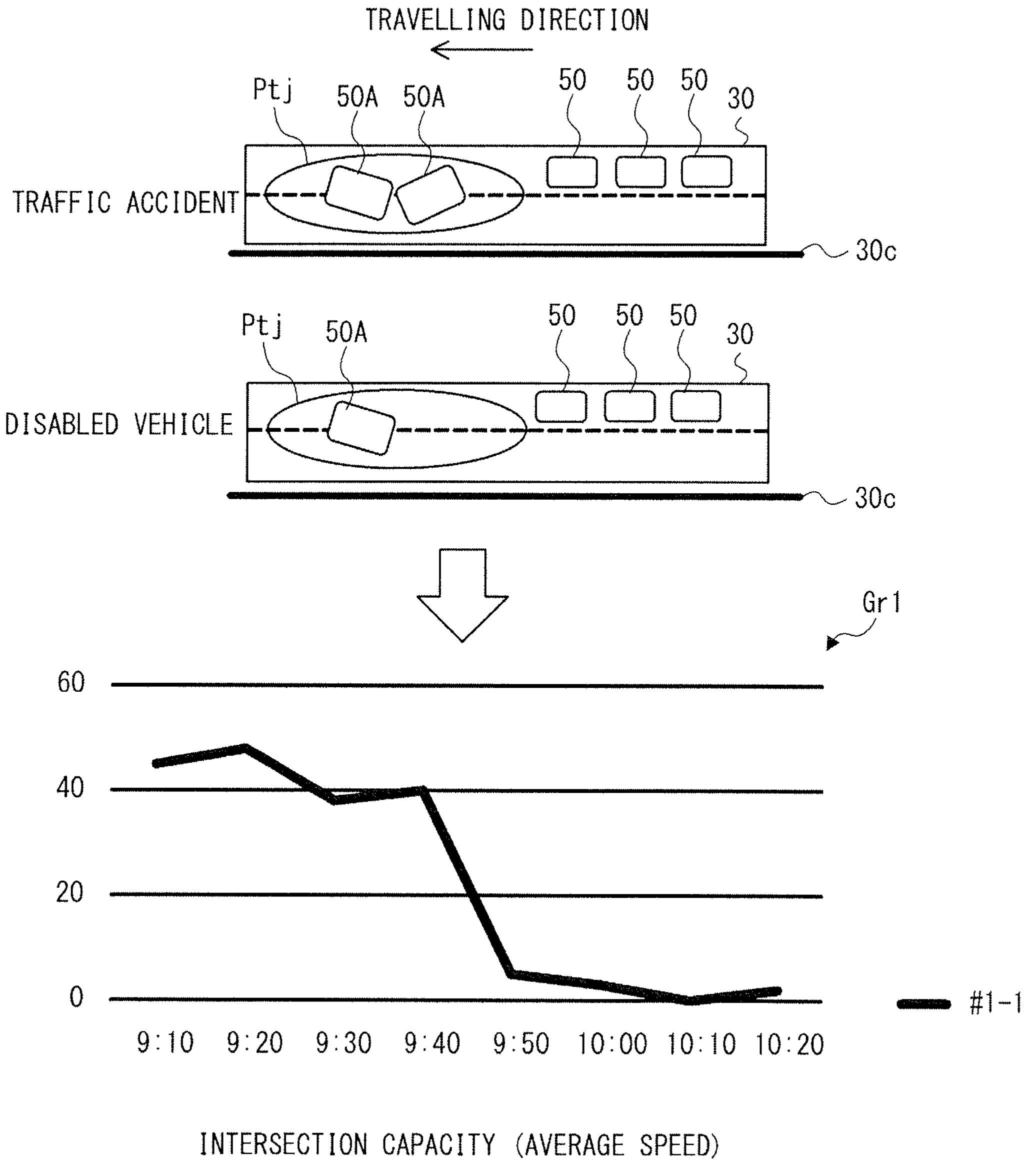
FIG. 10 is a diagram for describing an example of a relation between a traffic obstacle and a congestion cause.

FIGS. 10 to 16 are diagrams each describing an example of the relation between the traffic obstacle and the congestion cause. FIG. 10 shows an example in a case in which the congestion cause is a "traffic accident" and a "disabled vehicle". The cause determination unit 120 detects a traffic obstacle that stopped vehicles 50A are present in a congestion occurring place Ptj (congestion induced place) of the road 30 using the additional information. The cause determination unit 120 further detects the traffic obstacle that the speed of the subsequent vehicles 50 has suddenly reduced in a short period of time using the vehicle information. Specifically, the cause determination unit 120 detects that the average travelling speed of the vehicles 50 has been decreased by a predetermined speed (e.g., about 40 km/h) during a predetermined period of time (e.g., several minutes), as shown in a graph Gr1 indicating the change in the average travelling speed in the lane #1-1. In this case, when the number of stopped vehicles 50A is two or larger, the cause determination unit 120 determines that the congestion cause is a "traffic accident". Further, when the number of stopped vehicles 50A is one, the cause determination unit 120 determines that the congestion cause is a "disabled vehicle".

Figure 11:
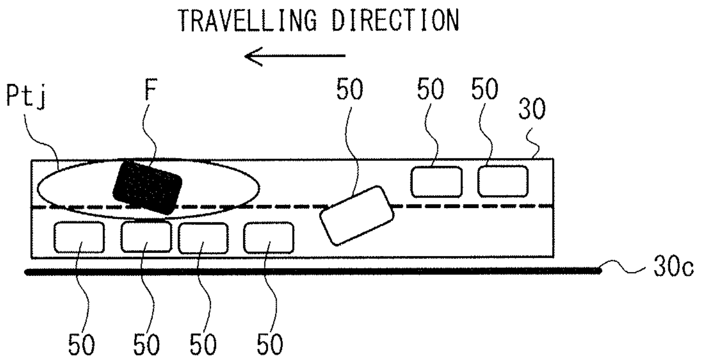
FIG. 11 is a diagram for describing an example of a relation between a traffic obstacle and a congestion cause.

FIG. 11 shows an example in which the congestion cause is a "falling object". The cause determination unit 120 detects the traffic obstacle that there is an object F other than a vehicle in the congestion occurring place Ptj (congestion induced place) on the road 30 using the additional information. Further, the cause determination unit 120 detects the traffic obstacle that the vehicles 50 are changing the lanes on the upstream side of the object F by analyzing the intersection images or using the vehicle information. In this case, the cause determination unit 120 determines that the congestion cause is a "falling object".

Figure 12:
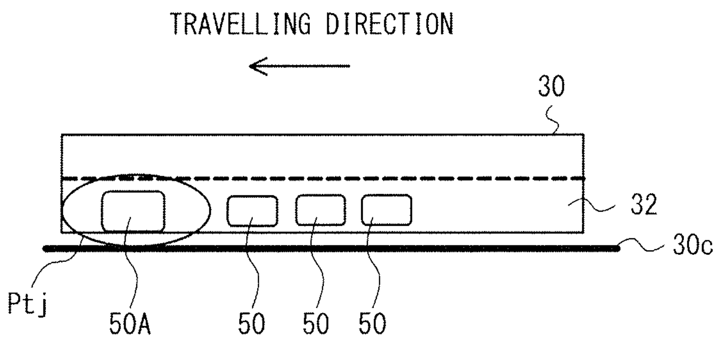
FIG. 12 is a diagram for describing an example of a relation between a traffic obstacle and a congestion cause.

FIG. 12 shows an example in which the congestion cause is a "short-period left-turn signal". The cause determination unit 120 detects the traffic obstacle that a stopped vehicle 50A is present in the congestion occurring place Ptj (congestion induced place) of the lane 32 that is closer to the center line 30*c* of the road 30 using the additional information. Further, the cause determination unit 120 detects the traffic obstacle that vehicles 50 follow the stopped vehicle 50A without changing the lanes on the upstream side of the stopped vehicle 50A by analyzing the intersection images or using the vehicle information. In this case, the cause determination unit 120 determines that the congestion cause is a "short-period left-turn signal".

Figure 13:
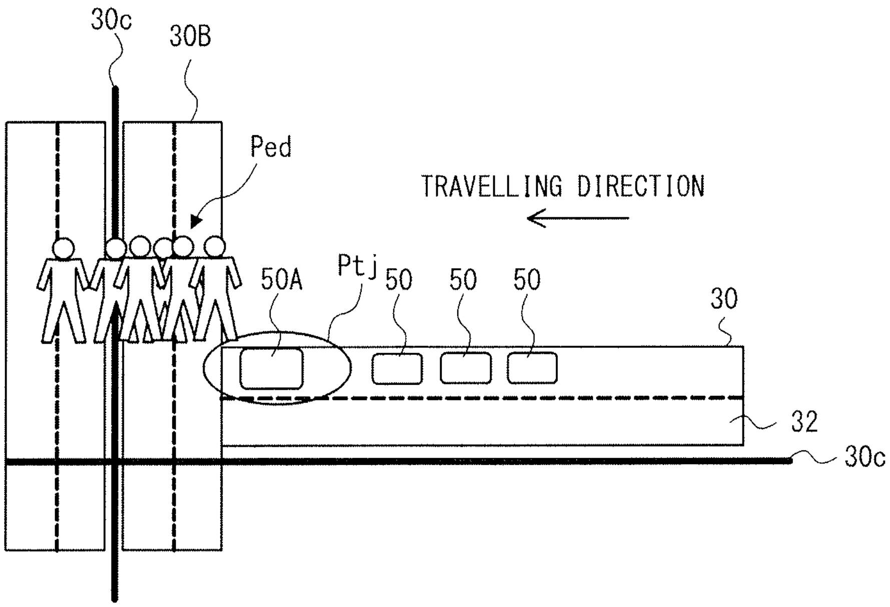
FIG. 13 is a diagram for describing an example of a relation between a traffic obstacle and a congestion cause.

FIG. 13 shows an example in which the congestion cause is "waiting for right turn due to the presence of a number of pedestrians". The cause determination unit 120 detects the traffic obstacle that there are a lot of pedestrians Ped whose number is larger than a predetermined number and who are crossing a road 30B that intersects with the lane 32 including the congestion occurring place Ptj (congestion induced place) using the additional information. Further, the cause determination unit 120 detects the traffic obstacle that there is a stopped vehicle 50A in the congestion occurring place Ptj (congestion induced place) of the lane 32 that is far from the center line 30*c* of the road 30 using the additional information. Further, the cause determination unit 120 detects the traffic obstacle that the vehicles 50 follow the stopped vehicle 50A without changing the lanes on the upstream side of the stopped vehicle 50A by analyzing the intersection images or using the vehicle information. In this case, the cause determination unit 120 determines that the congestion cause is "waiting for right turn due to the presence of a number of pedestrians".

Figure 14:
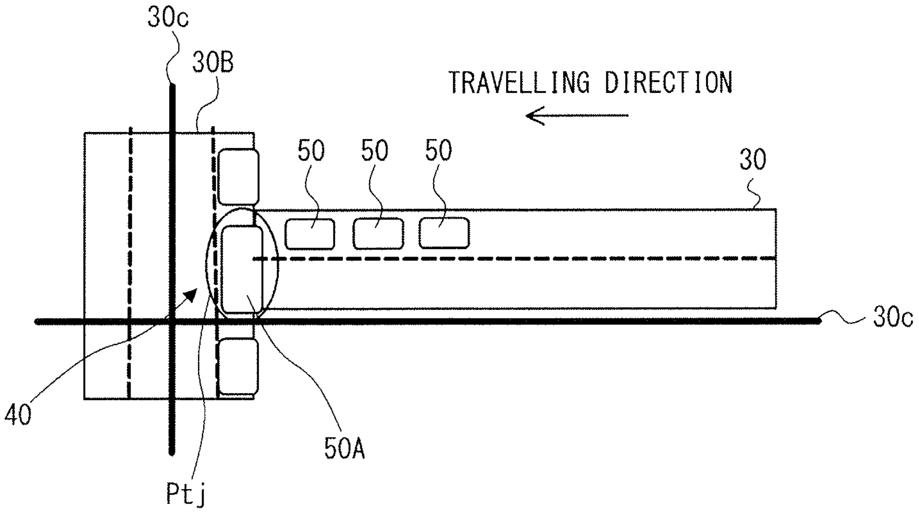
FIG. 14 is a diagram for describing an example of a relation between a traffic obstacle and a congestion cause.

FIG. 14 shows an example in which the congestion cause is "blockage of an intersection when a road is crowded". The cause determination unit 120 detects the traffic obstacle that a stopped vehicle 50A is present on the intersection 40 on the road 30B that intersects with the lane 32 including the congestion occurring place Ptj (congestion induced place) using the additional information. In this case, the cause determination unit 120 determines that the congestion cause is "blockage of an intersection when a road is crowded".

Figure 15:
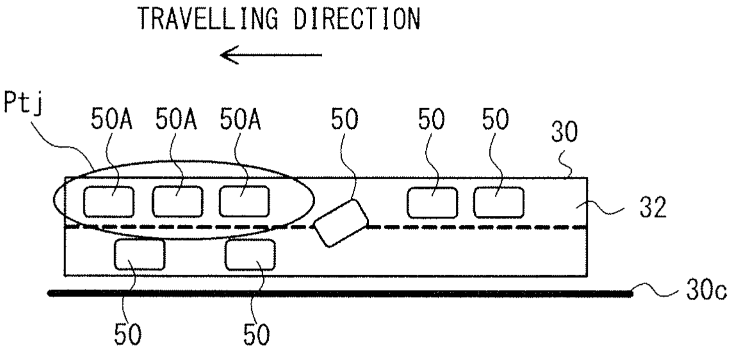
FIG. 15 is a diagram for describing an example of a relation between a traffic obstacle and a congestion cause.

FIG. 15 shows an example in which the congestion cause is "illegal parking". The cause determination unit 120 detects the traffic obstacle that there are stopped vehicles 50A in the congestion occurring place Ptj (congestion induced place) in the lane 32 far from the center line 30*c* of the road 30 using the additional information. Further, the cause determination unit 120 detects the traffic obstacle that the congestion occurring place Ptj is a parking prohibited area by using the additional information or analyzing the intersection images. Further, the cause determination unit 120 detects a traffic obstacle that the vehicles 50 are changing the lanes on the upstream side of the congestion occurring place Ptj by analyzing the intersection images or using the vehicle information. In this case, the cause determination unit 120 determines that the congestion cause is "illegal parking".

Figure 16:
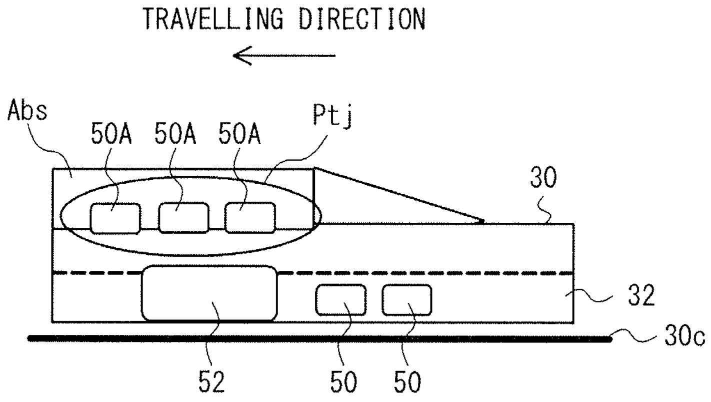
FIG. 16 is a diagram for describing an example of a relation between a traffic obstacle and a congestion cause.

FIG. 16 shows an example in which the congestion cause is "illegal parking in a bus stop area". The cause determination unit 120 detects the traffic obstacle that stopped vehicles 50A are present in the congestion occurring place Ptj (congestion induced place) of a bus stop area Abs using the additional information. Further, the cause determination unit 120 analyzes the intersection images and detects the traffic obstacle that a bus 52 is stopping in the lane 32 other than the bus stop area Abs. In this case, the cause determination unit 120 determines that the congestion cause is "illegal parking in a bus stop area".

The countermeasure presenting unit 130 presents the countermeasure method against the congestion cause determined in S140 (Step S160). Specifically, the countermeasure presenting unit 130 displays the countermeasure method on the interface unit 108 using the countermeasure information stored in the countermeasure information storage unit 132.

FIG. 17 is a diagram illustrating the countermeasure information according to the first example embodiment. In the example shown in FIG. 17, when the congestion cause is a "traffic accident", a "disabled vehicle", or a "falling object", the countermeasure presenting unit 130 presents a countermeasure method such as "dispatching an on-site police officer to the congestion occurring place (congestion induced place)". Further, when the congestion cause is "short-period left-turn signal", "waiting for right turn due to the presence of a number of pedestrians", or "blockage of an intersection when a road is crowded", the countermeasure presenting unit 130 presents a countermeasure method such as "changing signal lighting intervals" and "dispatching an on-site police officer to the congestion occurring place". Further, when the congestion cause is "illegal parking" or "illegal parking in a bus stop area", the countermeasure presenting unit 130 presents a countermeasure method such as "dispatching an on-site police officer to the congestion occurring place".

(Outline of Second Example Embodiment)

Next, a second example embodiment will be described. The second example embodiment is different from the first example embodiment in that an intersection that should be dealt with when congestion is occurred in a plurality of consecutive intersections is specified. Of the components according to the second example embodiment, components that are substantially the same as those in the first example embodiment are denoted by the same reference symbols. Further, the descriptions of the components that are substantially the same as those in the first example embodiment will be omitted as appropriate.

Figure 18:
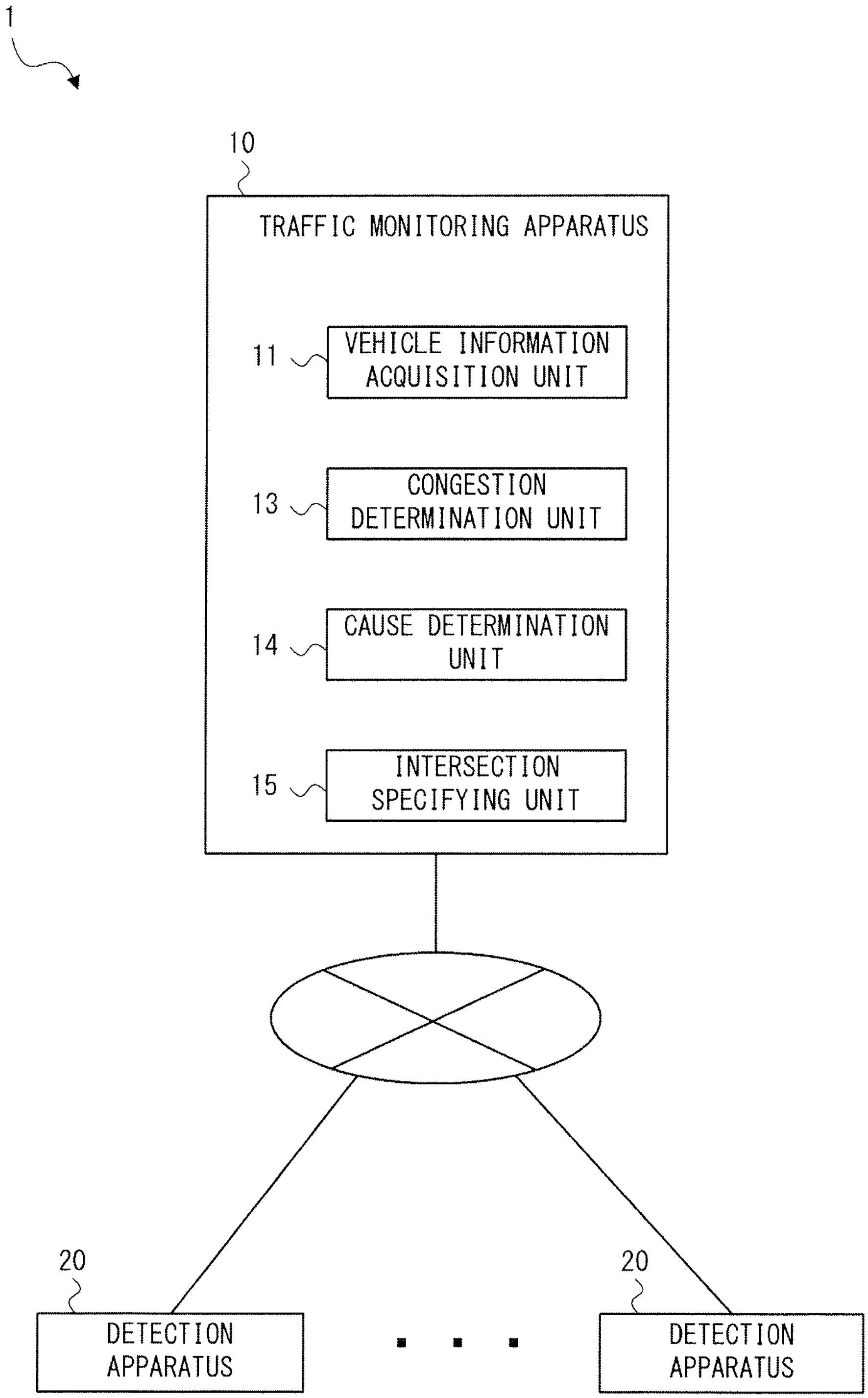
FIG. 18 is a diagram showing an outline of a traffic monitoring system according to a second example embodiment of the present disclosure.

FIG. 18 is a diagram showing an outline of a traffic monitoring system 1 according to the second example embodiment of the present disclosure. The traffic monitoring system 1 according to the second example embodiment of the present disclosure includes a traffic monitoring apparatus 10 and a plurality of detection apparatuses 20. The plurality of detection apparatuses 20 and the traffic monitoring apparatus 10 are connected to each other in such a way that they can communicate with each other via a wired or wireless network.

The traffic monitoring apparatus 10 monitors traffic of a plurality of intersections where the detection apparatuses 20 are installed. The traffic monitoring apparatus 10 includes a vehicle information acquisition unit 11 (vehicle information acquisition means), a congestion determination unit 13 (congestion determination means), a cause determination unit 14 (cause determination means), and an intersection specifying unit 15 (intersection specifying means). The vehicle information acquisition unit 11 acquires, from data received from each of the plurality of detection apparatuses 20, vehicle information regarding travelling states of vehicles that are present in the vicinity of the plurality of respective intersections. The congestion determination unit 13 determines, for each of the plurality of intersections, whether or not congestion is occurring based on the vehicle information and determines an intersection where the congestion has occurred to be a congested intersection. The intersection specifying unit 15 specifies, when there is a continuous congestion path including a plurality of consecutive congested intersections, a congestion-inducing intersection, which is an intersection that has induced congestion in the continuous congestion path. The cause determination unit 14 determines the cause of the congestion that has occurred in the congestion-inducing intersection.

As described above, the traffic monitoring apparatus 10 according to the second example embodiment of the present disclosure specifies, when there is a continuous congestion path including a plurality of consecutive congested intersections, the congestion-inducing intersection, which is an intersection that has induced congestion in the continuous congestion path. Then the traffic monitoring apparatus 100 according to the second example embodiment of the present disclosure determines the cause of the congestion that has occurred in the congestion-inducing intersection. When the congestion that has occurred in the congestion-inducing intersection has spread to another intersection, it is highly likely that the original cause of the congestion has not occurred in the other intersection. Therefore, the traffic monitoring system 1 according to the second example embodiment of the present disclosure is able to determine the cause of the congestion more definitely. Therefore, it is possible to examine countermeasures against congestion more appropriately. That is, it is possible to prevent the waste of taking countermeasures against the other intersection when the congestion that has occurred in the congestion-inducing intersection has spread to the other intersection. By using the traffic monitoring system 1 according to the second example embodiment of the present disclosure as well, it becomes possible to determine the cause of the congestion more definitely. Further, by using the traffic monitoring method executed by the traffic monitoring apparatus 10 and the program that executes the traffic monitoring method according to the second example embodiment of the present disclosure as well, it becomes possible to determine the cause of the congestion more definitely.

Second Example Embodiment

In the following description, with reference to the drawings, a second example embodiment will be described. For the sake of clarification of the description, the following description and the drawings are omitted and simplified as appropriate. Throughout the drawings, the same elements are denoted by the same reference symbols and overlapping descriptions are omitted as appropriate. Since the system configuration according to the second example embodiment is substantially similar to that shown in FIG. 2, the descriptions thereof will be omitted.

Figure 19:
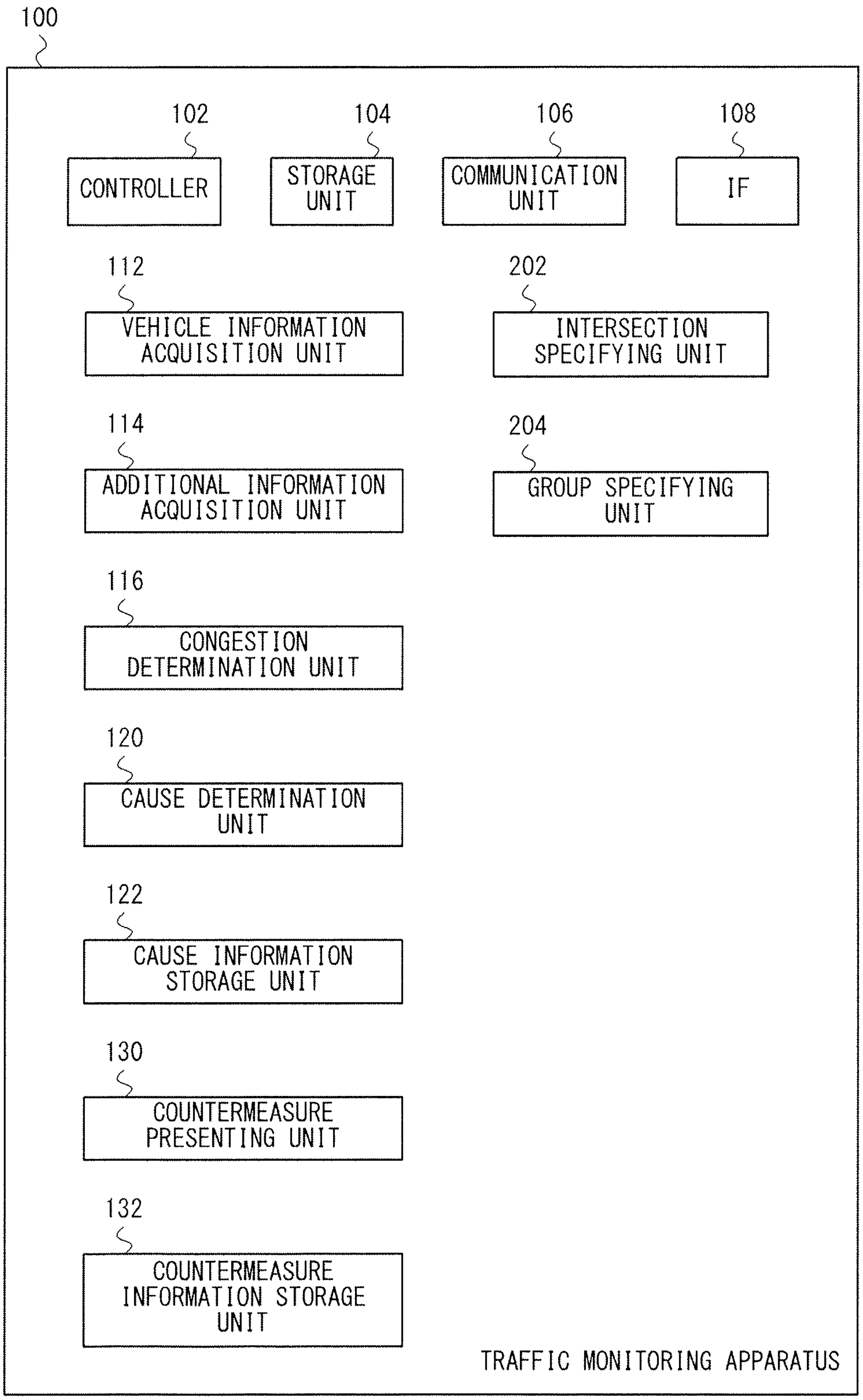
FIG. 19 is a diagram showing a configuration of a traffic monitoring apparatus according to the second example embodiment.

FIG. 19 is a diagram showing a configuration of a traffic monitoring apparatus 100 according to the second example embodiment. Since the hardware configuration of the traffic monitoring apparatus 100 according to the second example embodiment is substantially similar to that according to the first example embodiment, the descriptions thereof will be omitted.

Further, the traffic monitoring apparatus 100 according to the second example embodiment includes a vehicle information acquisition unit 112, an additional information acquisition unit 114, a congestion determination unit 116, a cause determination unit 120, a cause information storage unit 122, a countermeasure presenting unit 130, and a countermeasure information storage unit 132. The traffic monitoring apparatus 100 according to the second example embodiment further includes an intersection specifying unit 202 and a group specifying unit 204. The intersection specifying unit 202 and the group specifying unit 204 respectively serve as intersection specifying means and group specifying means. Unless otherwise stated, the functions of the other components are substantially similar to those according to the first example embodiment.

The congestion determination unit 116 determines, for each of the plurality of intersections 40, whether or not congestion is occurring using the vehicle information, and determines the intersection 40 where congestion has occurred to be a congested intersection. The intersection specifying unit 202 specifies, when there is a continuous congestion path including a plurality of consecutive congested intersections, the congestion-inducing intersection, which is an intersection that has induced congestion in the continuous congestion path. The cause determination unit 120 determines the cause of the congestion that has occurred in the congestion-inducing intersection. Note that the intersection specifying unit 202 may specify the congestion-inducing intersection based on the congestion level Dj calculated by the congestion determination unit 116.

The group specifying unit 204 specifies a group of a plurality of consecutive congested intersections having the congestion-inducing intersection at the top of the group in the continuous congestion path. Accordingly, it becomes possible for the operator to determine the range in which congestion may be eliminated when countermeasures are taken for the congestion-inducing intersection. In other words, the cause of the congestion of the group occurs in the vicinity of the congestion-inducing intersection.

Figure 20:
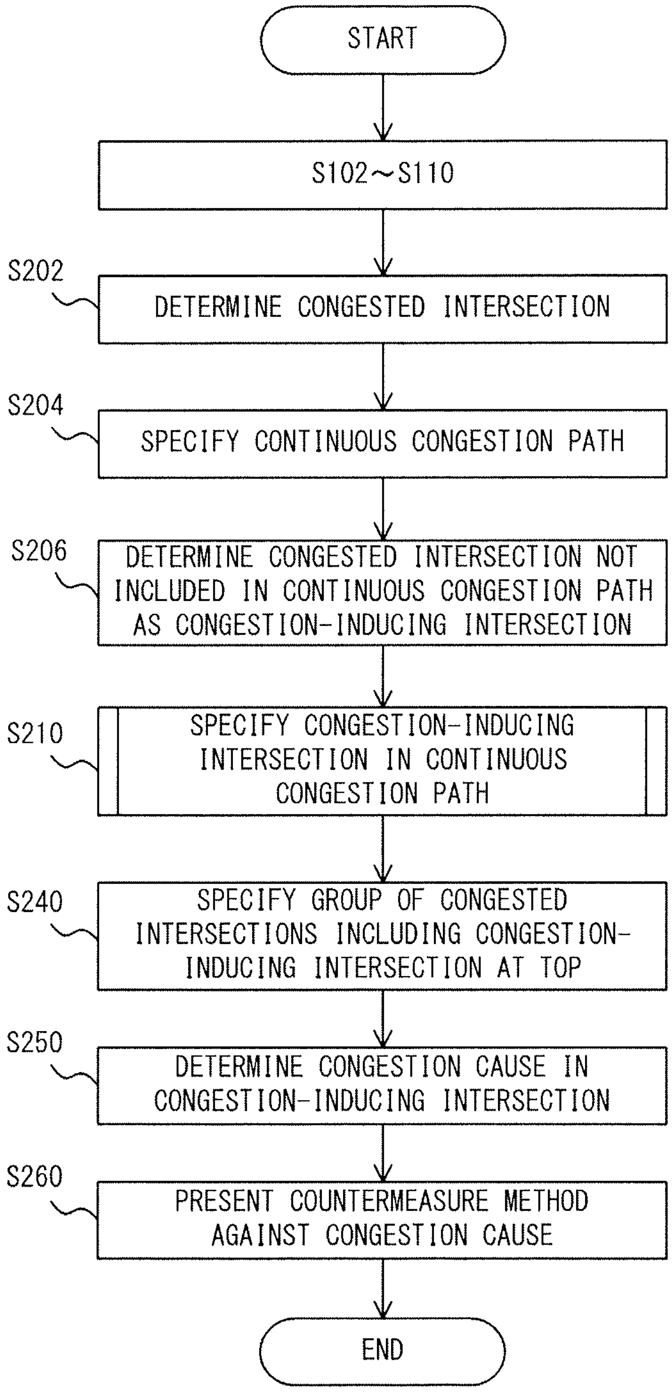
FIG. 20 is a flowchart showing a traffic monitoring method executed by the traffic monitoring apparatus according to the second example embodiment.

FIG. 20 is a flowchart showing a traffic monitoring method executed by the traffic monitoring apparatus 100 according to the second example embodiment. First, the traffic monitoring apparatus 100 according to the second example embodiment performs processing that is substantially similar to S102 to S110 in the flowchart shown in FIG. 6. Then the congestion determination unit 116 determines the congested intersection where the congestion has occurred (Step S202). In this case, the congestion determination unit 116 associates the congested intersection with the congestion level Dj in this congested intersection.

Next, the intersection specifying unit 202 specifies a continuous congestion path, which is a path formed by a continuous series of congested intersections (Step S204). Then the intersection specifying unit 202 determines whether or not each of the congested intersections is included in the continuous congestion path and determines that a congested intersection which is not included in the continuous congestion path is a congestion-inducing intersection (Step S206). Further, the intersection specifying unit 202 specifies a congestion-inducing intersection in the continuous congestion path, as will be described later with reference to FIG. 21 (Step S210).

Further, the intersection specifying unit 202 may cause the congestion-inducing intersection that has been specified to be displayed on the interface unit 108. The congestion-inducing intersection may be displayed, for example, on the map indicating the road network 4 in a noticeable way. Accordingly, the operator is able to easily recognize the congestion-inducing intersection.

Figure 21:
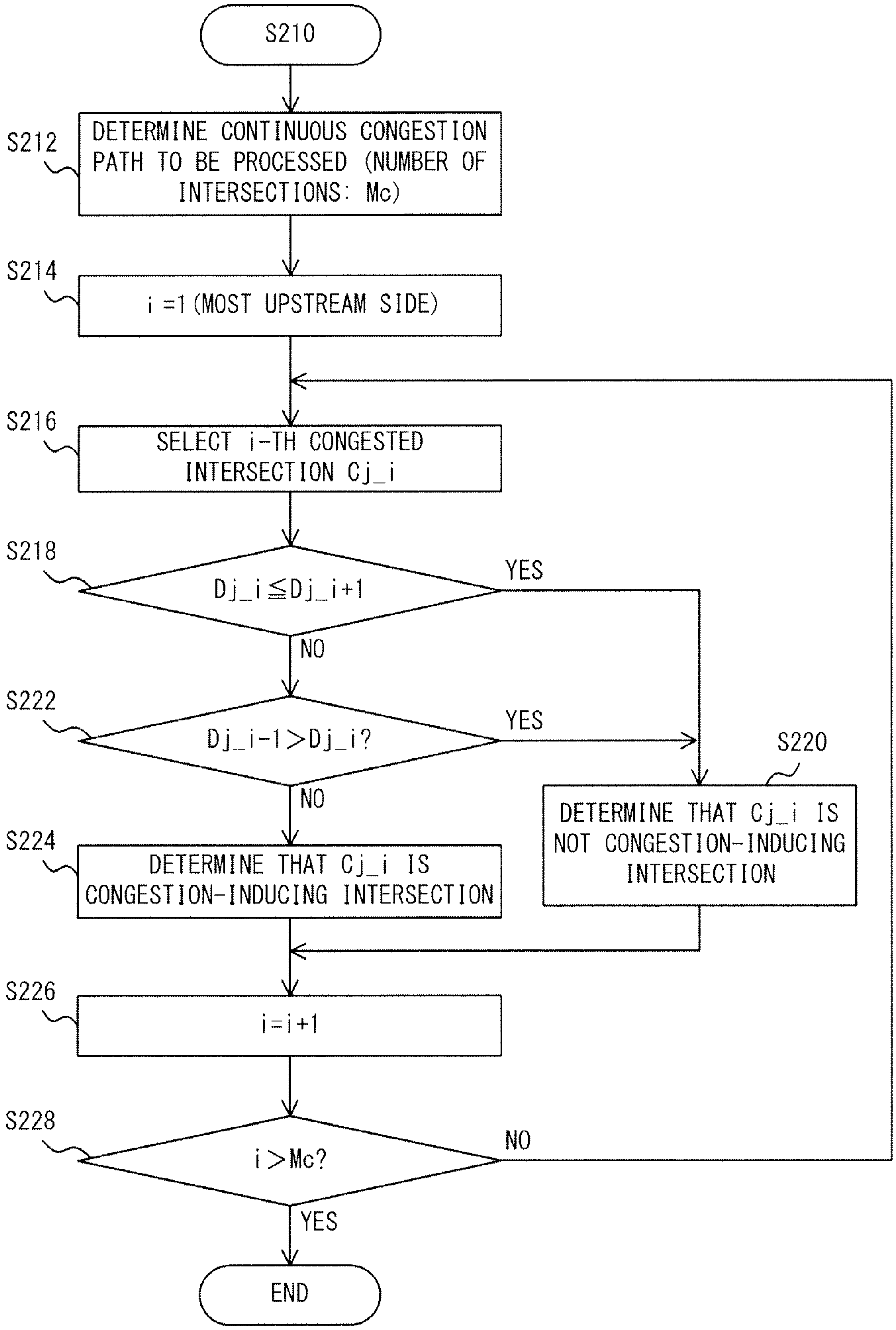
FIG. 21 is a flowchart illustrating a method of specifying a congestion-inducing intersection performed by an intersection specifying unit according to the second example embodiment.

FIG. 21 is a flowchart illustrating a method of specifying the congestion-inducing intersection performed by the intersection specifying unit 202 according to the second example embodiment. First, the intersection specifying unit 202 determines the continuous congestion path to be processed (Step S212). It is assumed here that the number of congested intersections included in the continuous congestion path to be processed is Mc (Mc is an integer equal to or larger than two). Then the intersection specifying unit 202 sets an initial value of i to 1, where i (i is an integer from 1 to Mc) denotes the order of the congested intersections counted from the congested intersection on the most upstream side in the continuous congestion path to be processed (Step S214). Then the intersection specifying unit 202 selects the i-th congested intersection Cj_i and sets the selected intersection as a processing target (Step S216). That is, the intersection specifying unit 202 first sets the congested intersection Cj_1 on the most upstream side as a processing target.

Figure 22:
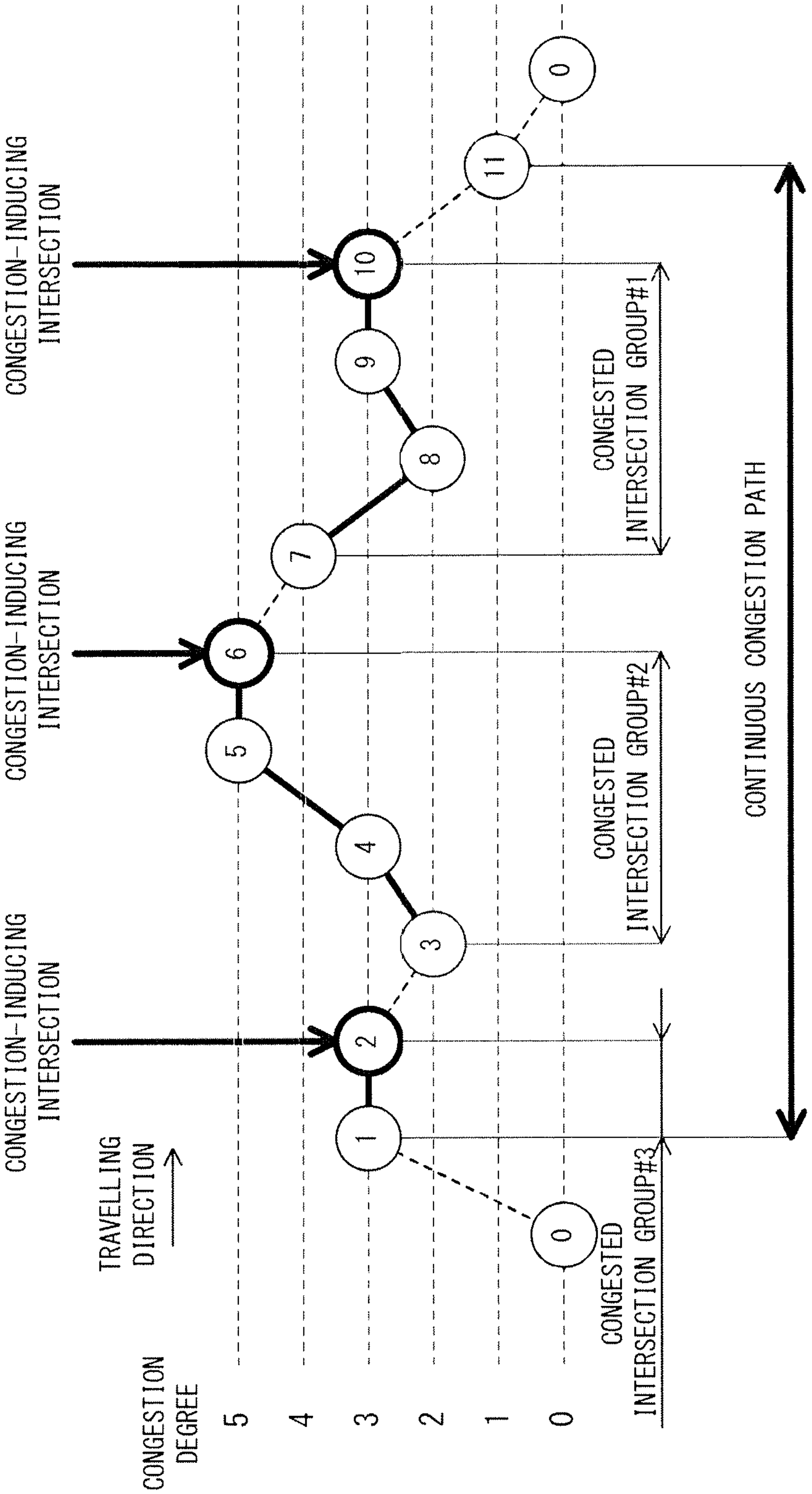
FIG. 22 is a diagram illustrating a continuous congestion path.

FIG. 22 is a diagram illustrating the continuous congestion path. The continuous congestion path (a series of congestions) is not limited to a straight path but may turn to the right or turn to the left in one intersection 40 (congested intersection Cj) in the road network 4 illustrated in FIG. 3 (e.g., the paths 34C and 34D in FIG. 9). In FIG. 22, the circles (○) indicate the intersections 40 and the numbers in the respective circles indicate the order i of the congested intersections Cj counted from the upstream side in the continuous congestion path. FIG. 22 indicates the continuous congestion path including 11 (i=1 to 11) congested intersections Cj. The intersection 40 ("0" is placed inside the circle) on the left side (upstream side) of the continuous congestion path indicates the intersection 40 where congestion is not occurring, which is immediately before the continuous congestion path. Further, the intersection 40 ("0" is placed inside the circle) on the right side (downstream side) of the continuous congestion path indicates the intersection 40 where congestion is not occurring, which is immediately after the continuous congestion path.

Further, in FIG. 22, the vertical direction indicates the congestion level Dj of each of the congested intersections Cj. The congestion level Dj here indicates the congestion level regarding the travelling direction of vehicles in the continuous congestion path. For example, the congestion level Dj of the first congested intersection Cj_1 is "3". Further, the congestion level Dj of the fifth congested intersection Cj_5 is "5". Further, the congestion level Dj of the eleventh congested intersection Cj_11 is "1".

The intersection specifying unit 202 determines whether or not the congestion level Dj_i of the congested intersection Cj_i to be processed is equal to or smaller than the congestion level Dj_i+1 of the following (on the downstream side) intersection Cj_i+1 (Step S218). That is, the intersection specifying unit 202 determines whether or not the congestion level Dj of the congested intersection Cj on the downstream side is higher than or the same as the congestion level Dj of the congested intersection Cj on the upstream side. The expression "the same level" here is not limited to a case in which the congestion levels Dj strictly coincide with each other. Even when there is a slight difference between the two congestion levels Dj, if the two congestion levels Dj can be regarded to be substantially the same (a small difference between them is negligible) when the levels of the congestion are determined, it can be said that they are in "the same level".

When the congestion level Dj_i is equal to or lower than the congestion level Dj_i+1 (YES in S218), the intersection specifying unit 202 determines that the congested intersection Cj_i to be processed is not a congestion-inducing intersection (Step S220). That is, when the congestion level Dj of the congested intersection Cj on the downstream side is higher than or the same as the congestion level Dj of the congested intersection Cj on the upstream side, the intersection specifying unit 202 determines that the congested intersection Cj on the upstream side is not a congestion-inducing intersection.

On the other hand, when the congestion level Dj_i is not equal to or smaller than the congestion level Dj_i+1 (NO in S218), the intersection specifying unit 202 determines whether or not the congestion level Dj_i of the congested intersection Cj_i to be processed is lower than the congestion level Dj_i−1 of the intersection Cj_i−1 which is just before (on the upstream side of) the congested intersection Cj_i (Step S222). When the congestion level Dj_i is lower than the congestion level Dj_i−1 (YES in S222), the intersection specifying unit 202 determines that the congested intersection Cj_i to be processed is not a congestion-inducing intersection (S220). That is, when the congestion level Dj of the congested intersection Cj on the downstream side is lower than the congestion level Dj of the congested intersection Cj on the upstream side, the intersection specifying unit 202 determines that the congested intersection Cj on the downstream side is not a congestion-inducing intersection.

On the other hand, when the congestion level Dj_i is not lower than the congestion level Dj_i−1 (NO in S222), the intersection specifying unit 202 determines that the congested intersection Cj_i to be processed is a congestion-inducing intersection (Step S224). That is, when the congestion level Dj_i is higher than or the same as the congestion level Dj_i−1, the intersection specifying unit 202 determines that the congested intersection Cj_i to be processed is a congestion-inducing intersection. As described above, when the congestion level Dj has been lowered (improved) on the downstream side of the congested intersection Cj_i while the congestion level Dj has not been lowered (improved) on the upstream side of the congested intersection Cj_i to be processed, it is determined that the congested intersection Cj_i to be processed is a congestion-inducing intersection.

The intersection specifying unit 202 increments i by one (Step S226) and determines whether or not i>Mc is satisfied (Step S228). When i>Mc is not satisfied (NO in S228), then the process goes back to S216, and the intersection specifying unit 202 performs processing of S216 to S226, setting the following congested intersection Cj as a processing target. On the other hand, when i>Mc is satisfied (YES in S228), it is determined that processing for all the Mc congested intersections Cj in the continuous congestion path has been ended, and the processing of S110 is ended.

In the example shown in FIG. 22, when the first (i=1) congested intersection Cj_1 is a target to be processed, the intersection specifying unit 202 determines, in the processing of S218, that the congestion level Dj_1 is in the same level as the congestion level Dj_2. Therefore, it is determined that the first congested intersection Cj_1 is not a congestion-inducing intersection (S220).

Further, when the second (i=2) congested intersection Cj_2 is a target to be processed, the intersection specifying unit 202 determines, in the processing of S218, that the congestion level Dj_2 is higher than the congestion level Dj_3. In other words, it is determined that the congestion level Dj_3 of the congested intersection Cj_3 on the downstream side is lower than the congestion level Dj_2 of the congested intersection Cj_2 on the upstream side. Further, the intersection specifying unit 202 determines, in the processing of S222, that the congestion level Dj_2 is the same as the congestion level Dj_1. In other words, it is determined that the congestion level Dj_2 of the congested intersection Cj_2 to be processed is not lower than the congestion level Dj_1 of the congested intersection Cj_1 on the upstream side. Therefore, it is determined that the second congested intersection Cj_2 is a congestion-inducing intersection (S224).

Further, when the third (i=3) congested intersection Cj_3 is a target to be processed, the intersection specifying unit 202 determines, in the processing of S218, that the congestion level Dj_3 is lower than the congestion level Dj_4. Therefore, it is determined that the third congested intersection Cj_3 is not a congestion-inducing intersection (S220).

Further, when the seventh (i=7) congested intersection Cj_7 is a target to be processed, the intersection specifying unit 202 determines, in the processing of S218, that the congestion level Dj_7 is higher than the congestion level Dj_8. Further, the intersection specifying unit 202 determines, in the processing of S222, that the congestion level Dj_7 is lower than the congestion level Dj_6. Therefore, it is determined that the seventh congested intersection Cj_7 is not a congestion-inducing intersection (S220).

As described above, in the example shown in FIG. 22, the intersection specifying unit 202 determines that the second congested intersection Cj_2, the sixth congested intersection Cj_6, and the tenth congested intersection Cj_10 from the upstream side are congestion-inducing intersections. As described above, in the example shown in FIG. 22, a plurality of congestion-inducing intersections are present in the continuous congestion path. Further, in the example shown in FIG. 22, the eleventh congested intersection Cj_11, which is at the top of the continuous congestion path, is not a congestion-inducing intersection.

As described above, in the continuous congestion path, the top congested intersection is not always a congestion-inducing intersection. Therefore, according to a technique of simply determining that the cause of the congestion is near the top of the line of congestion cars (continuous congestion path), it is possible that the congestion may not be eliminated. On the other hand, the traffic monitoring apparatus 100 according to the second example embodiment is able to appropriately specify the congestion-inducing intersection in the continuous congestion path. Therefore, the traffic monitoring apparatus 100 according to the second example embodiment is able to appropriately determine the original cause of the congestion that has occurred in the continuous congestion path.

Next, the group specifying unit 204 specifies a group of a plurality of consecutive congested intersections including the congestion-inducing intersection at the top of the group in the continuous congestion path (Step S240). Specifically, the group specifying unit 204 classifies a group of congested intersections Cj including the congestion-inducing intersection that has been specified in S210 at the top of the group and the congested intersection which is next to (on the downstream side of) the congestion-inducing intersection on the upstream side of the above congestion-inducing intersection in the vehicle travelling direction at the end of the group as one congested intersection group. Note that, regarding the congested intersection group including the congestion-inducing intersection on the most upstream side of the continuous congestion path at the top of the group, the congested intersection Cj (Cj_1) on the most upstream side of the continuous congestion path may be at the end. As described above, the group specifying unit 204 divides the continuous congestion path into one or more congested intersection groups including the congestion-inducing intersection at the top of the group. It can be said that each of the congested intersection groups is a continuous congestion path since it is a part of the continuous congestion path.

Further, the processing of S240 is not processing that is absolutely necessary in the second example embodiment.

Note that the group specifying unit 204 may cause the congested intersection groups to be displayed on the interface unit 108. The congested intersection groups may be displayed, for example, on the map indicating the road network 4 in a noticeable way. Accordingly, the operator is able to easily recognize the congested intersection groups. Accordingly, the operator is able to easily recognize which area of congestion may be eliminated by taking countermeasures against the congestion for the congestion-inducing intersection.

In the example shown in FIG. 22, the group specifying unit 204 specifies a congested intersection group #1 including the tenth congested intersection Cj_10 from the upstream side at the top and the seventh congested intersection Cj_7 from the upstream side at the end. Further, the group specifying unit 204 specifies a congested intersection group #2 including the sixth congested intersection Cj_6 from the upstream side at the top and the third congested intersection Cj_3 from the upstream side at the end. Further, the group specifying unit 204 specifies a congested intersection group #3 including the second congested intersection Cj_2 from the upstream side at the top and the first congested intersection Cj_1 from the upstream side at the end. As described above, the group specifying unit 204 divides the continuous congestion path into three groups.

Accordingly, the operator is able to easily recognize that the congestion in the congested intersection group #1 may be eliminated if countermeasures against the congestion cause are taken for the tenth congested intersection Cj_10 from the upstream side. Further, the operator is able to easily recognize that the congestion in the congested intersection group #2 may be eliminated if countermeasures against the congestion cause are taken for the sixth congested intersection Cj_6 from the upstream side. Further, the operator is able to easily recognize that the congestion in the congested intersection group #3 may be eliminated if countermeasures against the congestion cause are taken for the second congested intersection Cj_2 from the upstream side.

Next, the cause determination unit 120 determines the cause of the congestion that has occurred in the congestion-inducing intersection (Step S250). Specifically, the cause determination unit 120 may determine the congestion cause of the congestion-inducing intersection by performing processing substantially similar to the processing of S152 in FIG. 8. Then the countermeasure presenting unit 130 presents the countermeasure method against the congestion cause determined in S250 using the countermeasure information, similar to the processing of S160 in FIG. 6 (Step S260). Accordingly, the operator is able to easily examine the countermeasures against the cause of the congestion that has occurred in the congestion-inducing intersection. Therefore, it becomes possible to take countermeasures against congestion in the continuous congestion path (congested intersection group) more efficiently.

Figure 23:
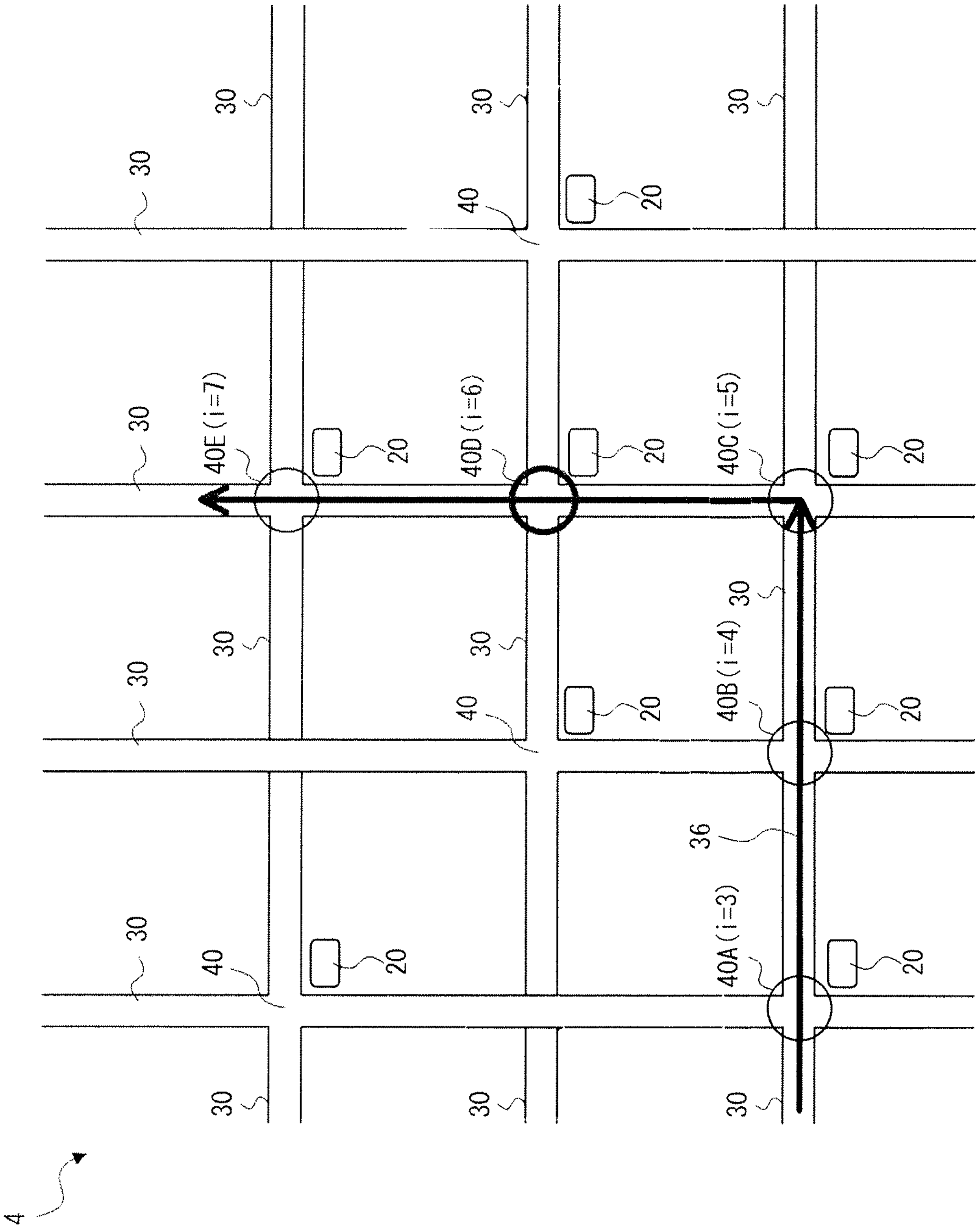
FIG. 23 is a diagram showing an example of the continuous congestion path in a road network.

FIG. 23 is a diagram showing an example of the continuous congestion path in the road network 4. In the example shown in FIG. 23, in intersections 40A, 40B, 40C, 40D, and 40E, a series of congestions (a continuous congestion path 36) with the intersection 40A on the upstream side and the intersection 40E on the downstream side is occurring. Further, the continuous congestion path 36 is turning to the left in the intersection 40C.

Assume here that the intersections 40A, 40B, 40C, 40D, and 40E respectively correspond to the third, the fourth, the fifth, the sixth, and the seventh congested intersections Cj from the upstream side in FIG. 22. In this case, in the continuous congestion path 36, the intersection 40D is a congestion-inducing intersection. That is, congestion is alleviated more in the intersection 40E which is on the downstream side of the intersection 40D than in the intersection 40D. Therefore, in this case, when countermeasures are taken for the intersection 40D, which is the congestion-inducing intersection, congestion may be eliminated also in the intersections 40C, 40B, and 40A, which are congested intersections on the upstream side of the intersection 40D. In other words, even when countermeasures against congestion are taken in the intersections 40C, 40B, and 40A, it is possible that the congestion in these intersections 40 may not be eliminated. As described above, the traffic monitoring apparatus 100 according to the second example embodiment is able to prevent the waste of dispatching, for example, an on-site police officer to the intersection 40C just because congestion is occurring, for example, in the intersection 40C.

(Outline According to Third Example Embodiment)

Next, a third example embodiment will be described. The third example embodiment is different from the other example embodiments in that it is taken into account which continuous congestion path should be preferentially dealt with when there are a plurality of continuous congestion paths (congested intersection group) in which a series of congestions has occurred in a plurality of consecutive intersections. Of the components according to the third example embodiment, components that are substantially the same as the components in the other example embodiments are denoted by the same reference symbols. Further, the descriptions of the components that are substantially the same as the components in the other example embodiments will be omitted as appropriate.

Figure 24:
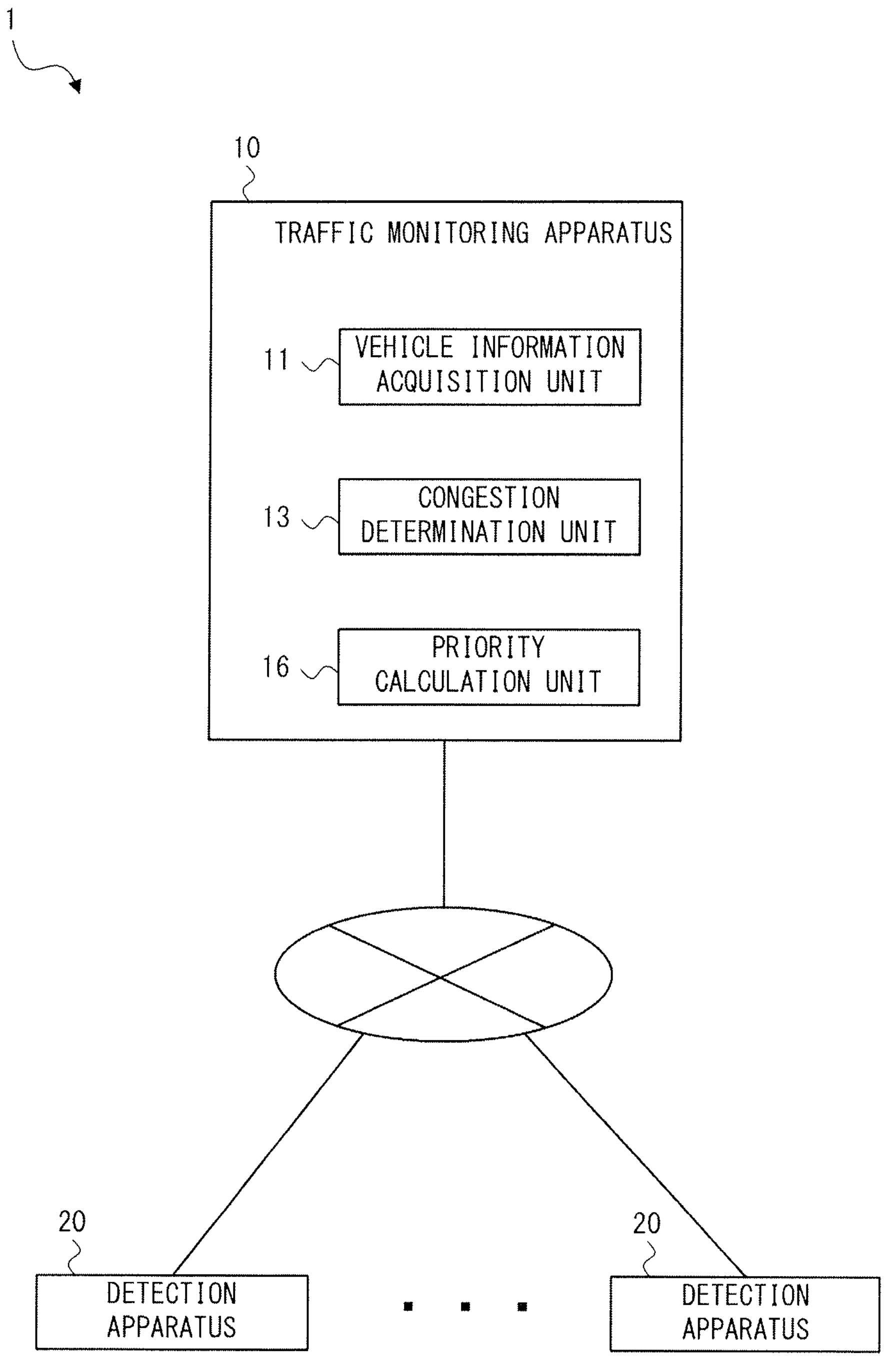
FIG. 24 is a diagram showing an outline of a traffic monitoring system according to a third example embodiment of the present disclosure.

FIG. 24 is a diagram showing an outline of a traffic monitoring system 1 according to the third example embodiment of the present disclosure. The traffic monitoring system 1 according to the third example embodiment of the present disclosure includes a traffic monitoring apparatus 10 and a plurality of detection apparatuses 20. The plurality of detection apparatuses 20 and the traffic monitoring apparatus 10 are connected to each other in such a way that they can communicate with each other via a wired or wireless network.

The traffic monitoring apparatus 10 monitors traffic of a plurality of intersections where the detection apparatuses 20 are installed. The traffic monitoring apparatus 10 includes a vehicle information acquisition unit 11 (vehicle information acquisition means), a congestion determination unit 13 (congestion determination means), and a priority calculation unit 16 (priority calculation means). The vehicle information acquisition unit 11 acquires vehicle information regarding travelling states of vehicles that are present in the vicinity of the plurality of respective intersections from data received from each of the plurality of detection apparatuses 20. The congestion determination unit 13 determines, for each of the plurality of intersections, whether or not congestion is occurring based on the vehicle information and determines an intersection where the congestion has occurred to be a congested intersection. The priority calculation unit 16 calculates, for each of a plurality of continuous congestion paths, the priority level for implementing measures to eliminate congestion based on at least the vehicle travelling direction in the continuous congestion path.

As described above, the traffic monitoring apparatus 10 according to the third example embodiment of the present disclosure calculates, for each of the plurality of continuous congestion paths, the priority level for implementing measures to eliminate congestion. In the third example embodiment of the present disclosure, the priority level of the continuous congestion path with severe congestion is not simply increased. This is because when the traffic demand in a city is comprehensively taken into account in the road network 4 around the city, it is not always necessary to preferentially deal with the continuous congestion path with severe congestion (i.e., the congestion level is high).

Accordingly, according to the third example embodiment of the present disclosure, it is possible to efficiently determine which one of the plurality of continuous congestion paths should be preferentially dealt with to eliminate congestion. Therefore, according to the third example embodiment of the present disclosure, it is possible to efficiently eliminate congestion in the entire city by efficiently using limited physical and human resources. By employing the traffic monitoring system 1 according to the third example embodiment of the present disclosure as well, it is possible to efficiently determine which one of the plurality of continuous congestion paths should be preferentially dealt with to eliminate congestion. Further, by using the traffic monitoring method executed by the traffic monitoring apparatus 10 and the program that executes the traffic monitoring method according to the third example embodiment of the present disclosure, it is possible to efficiently determine which one of the plurality of continuous congestion paths should be preferentially dealt with to eliminate congestion.

Third Example Embodiment

In the following description, with reference to the drawings, a third example embodiment will be described. For the sake of clarification of the description, the following description and the drawings are omitted and simplified as appropriate. Throughout the drawings, the same elements are denoted by the same reference symbols and overlapping descriptions are omitted as appropriate. Since the system configuration according to the third example embodiment is substantially similar to that shown in FIG. 2, the descriptions thereof will be omitted.

Figure 25:
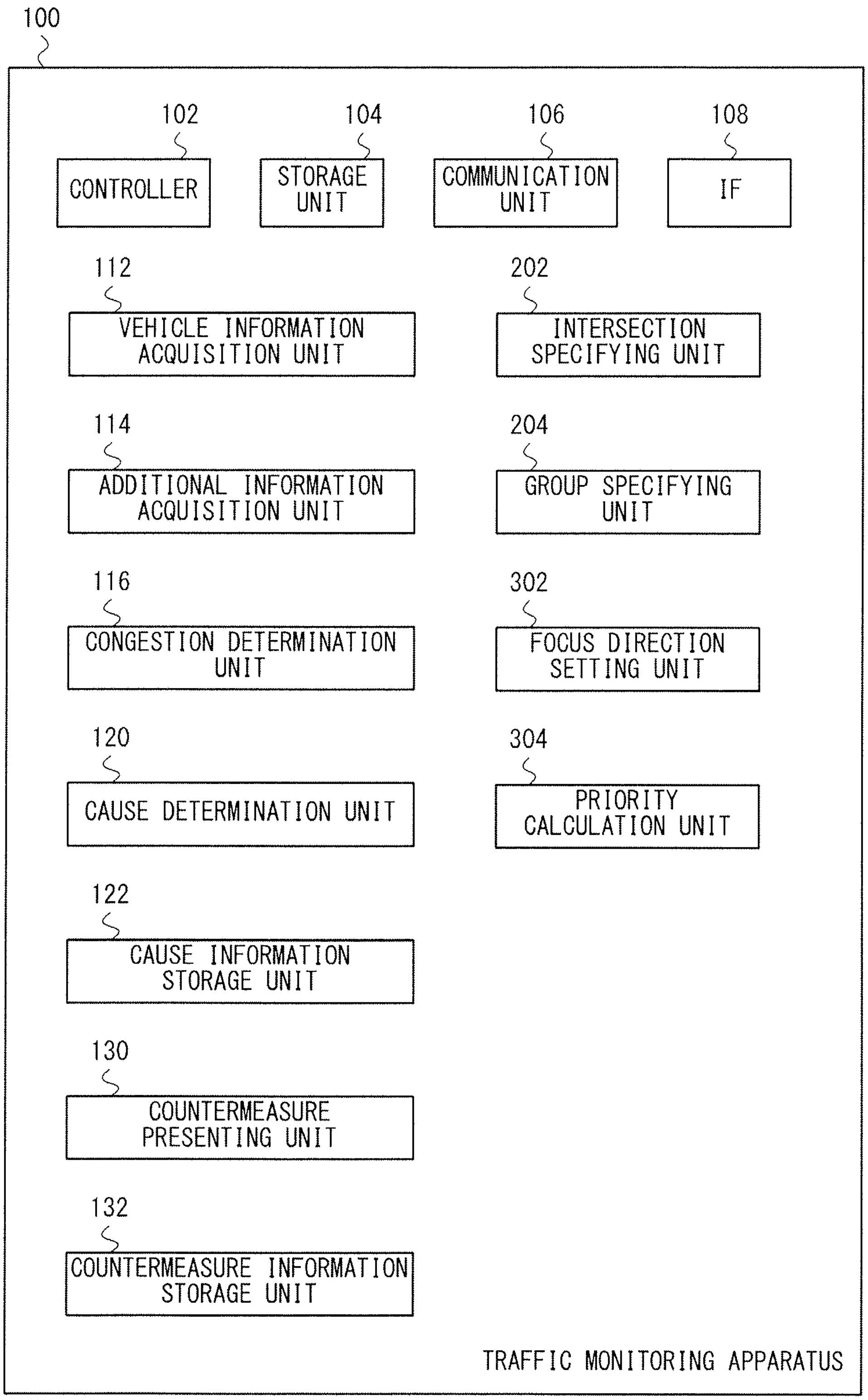
FIG. 25 is a diagram showing a configuration of a traffic monitoring apparatus according to the third example embodiment.

FIG. 25 is a diagram showing a configuration of a traffic monitoring apparatus 100 according to the third example embodiment. Since the hardware configuration of the traffic monitoring apparatus 100 according to the third example embodiment is substantially similar to that according to the first example embodiment, the descriptions thereof will be omitted.

Further, the traffic monitoring apparatus 100 according to the third example embodiment includes a vehicle information acquisition unit 112, an additional information acquisition unit 114, a congestion determination unit 116, a cause determination unit 120, a cause information storage unit 122, a countermeasure presenting unit 130, and a countermeasure information storage unit 132. Further, the traffic monitoring apparatus 100 according to the third example embodiment includes an intersection specifying unit 202 and a group specifying unit 204. Further, the traffic monitoring apparatus 100 according to the third example embodiment includes a focus direction setting unit 302 and a priority calculation unit 304. The focus direction setting unit 302 and the priority calculation unit 304 respectively function as focus direction setting means and priority calculation means. Unless otherwise specified, the functions of the other components are substantially similar to those in the first and second example embodiments.

The focus direction setting unit 302 sets the focus direction in the road network 4 in advance. The "focus direction" here is a direction that intensive countermeasures against congestion should be taken due to a reason such as a high traffic demand. The details thereof will be described later. Note that the focus direction may be set, for example, by an operator operating the interface unit 108.

The priority calculation unit 304 calculates, for each of the plurality of continuous congestion paths, the priority level for implementing measures to eliminate congestion based on at least the vehicle travelling direction in the continuous congestion path. The priority calculation unit 304 calculates the priority in such a way that the priority level of the continuous congestion path is increased when the vehicle travelling direction in the continuous congestion path corresponds to the focus direction set by the focus direction setting unit 302. The details thereof will be described later.

Figure 26:
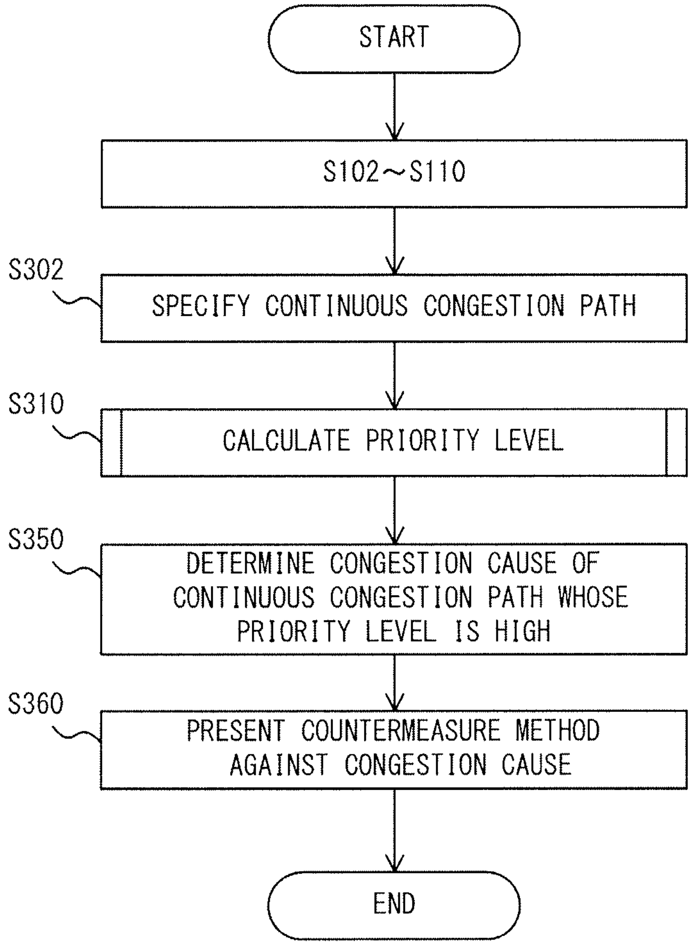
FIG. 26 is a flowchart showing a traffic monitoring method executed by the traffic monitoring apparatus according to the third example embodiment.

FIG. 26 is a flowchart showing a traffic monitoring method executed by the traffic monitoring apparatus 100 according to the third example embodiment. First, the traffic monitoring apparatus 100 according to the third example embodiment performs processing that is substantially similar to the processing of S102 to S110 in the flowchart shown in FIG. 6. Then the traffic monitoring apparatus 100 according to the third example embodiment specifies the continuous congestion path by performing processing of S202 to S240 in the flowchart shown in FIG. 20 (Step S302). The continuous congestion path specified in S302 may either be each of congested intersection groups or a continuous congestion path including a plurality of congested intersection groups (see FIG. 22).

Next, the priority calculation unit 304 calculates the priority level for each continuous congestion path (Step S310). Specifically, the priority calculation unit 304 calculates the priority of each of the continuous congestion paths by the method illustrated in FIG. 27. The method of calculating the priority is not limited to the example shown in FIG. 27.

Figure 27:
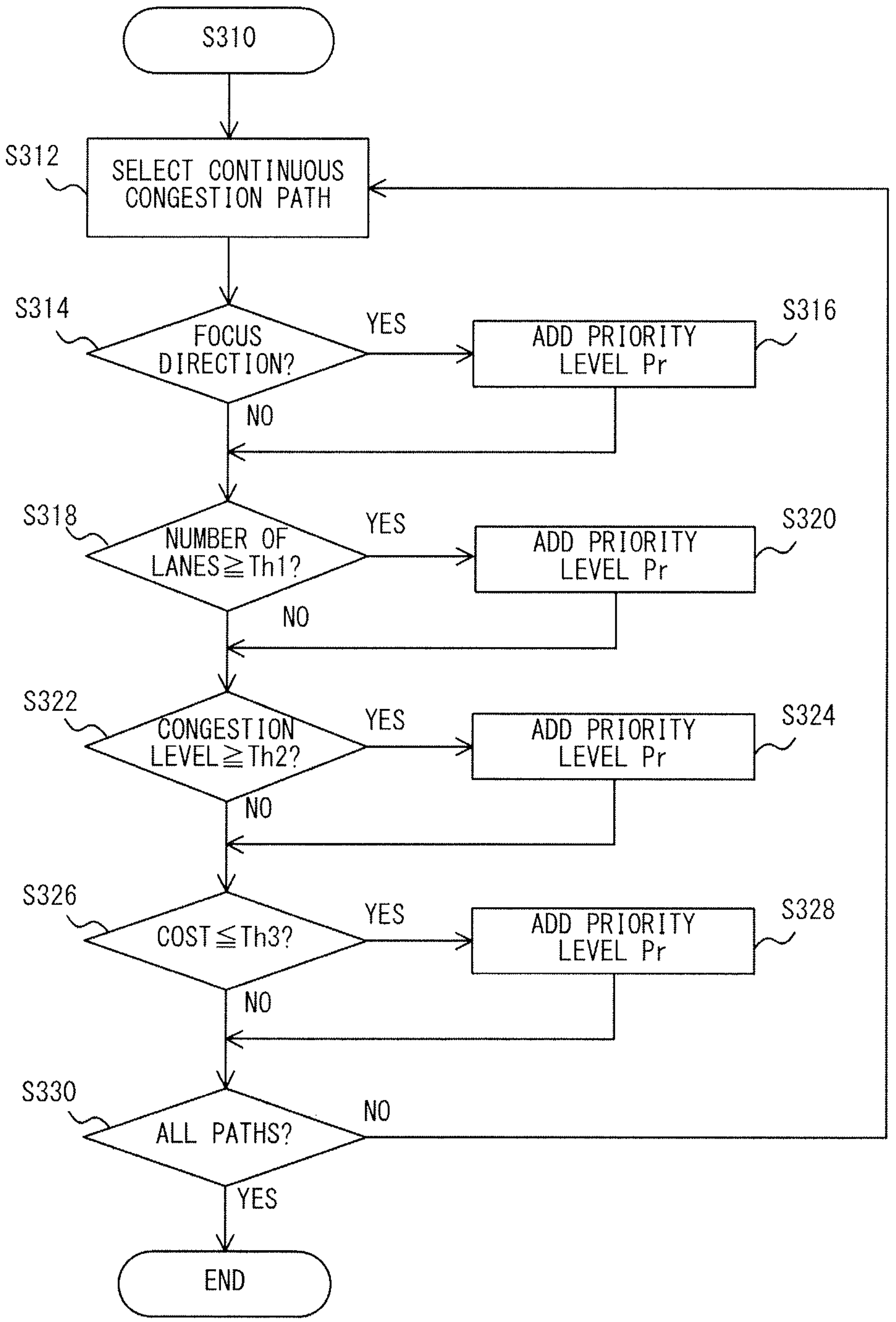
FIG. 27 is a diagram illustrating a priority calculation method performed by a priority calculation unit according to the third example embodiment.

FIG. 27 is a diagram illustrating a priority calculation method performed by the priority calculation unit 304 according to the third example embodiment. First, the priority calculation unit 304 selects the continuous congestion path to be processed (Step S312). After that, in S314 to S328, processing of calculating the priority level of the continuous congestion path that has been selected is performed.

The priority calculation unit 304 determines whether or not the travelling direction of the continuous congestion path to be processed corresponds to the focus direction (Step S314). When the travelling direction of the continuous congestion path corresponds to the focus direction (YES in S314), the priority calculation unit 304 adds a priority level Pr of the continuous congestion path (Step S316). The added value may be set as appropriate depending on how much emphasis should be placed on the determination regarding whether the travelling direction of the continuous congestion path corresponds to the focus direction when the priority is calculated.

In the third example embodiment, the continuous congestion path in which the travelling direction corresponds to the focus direction is preferentially dealt with. Therefore, when the travelling direction of the continuous congestion path does not correspond to the focus direction (NO in S314), the priority calculation unit 304 may end the following processing, determining that the priority is "0". Further, the priority level Pr added in the processing of S316 may be much (e.g., ten times) larger than the priority level added in the other processing.

Figure 29:
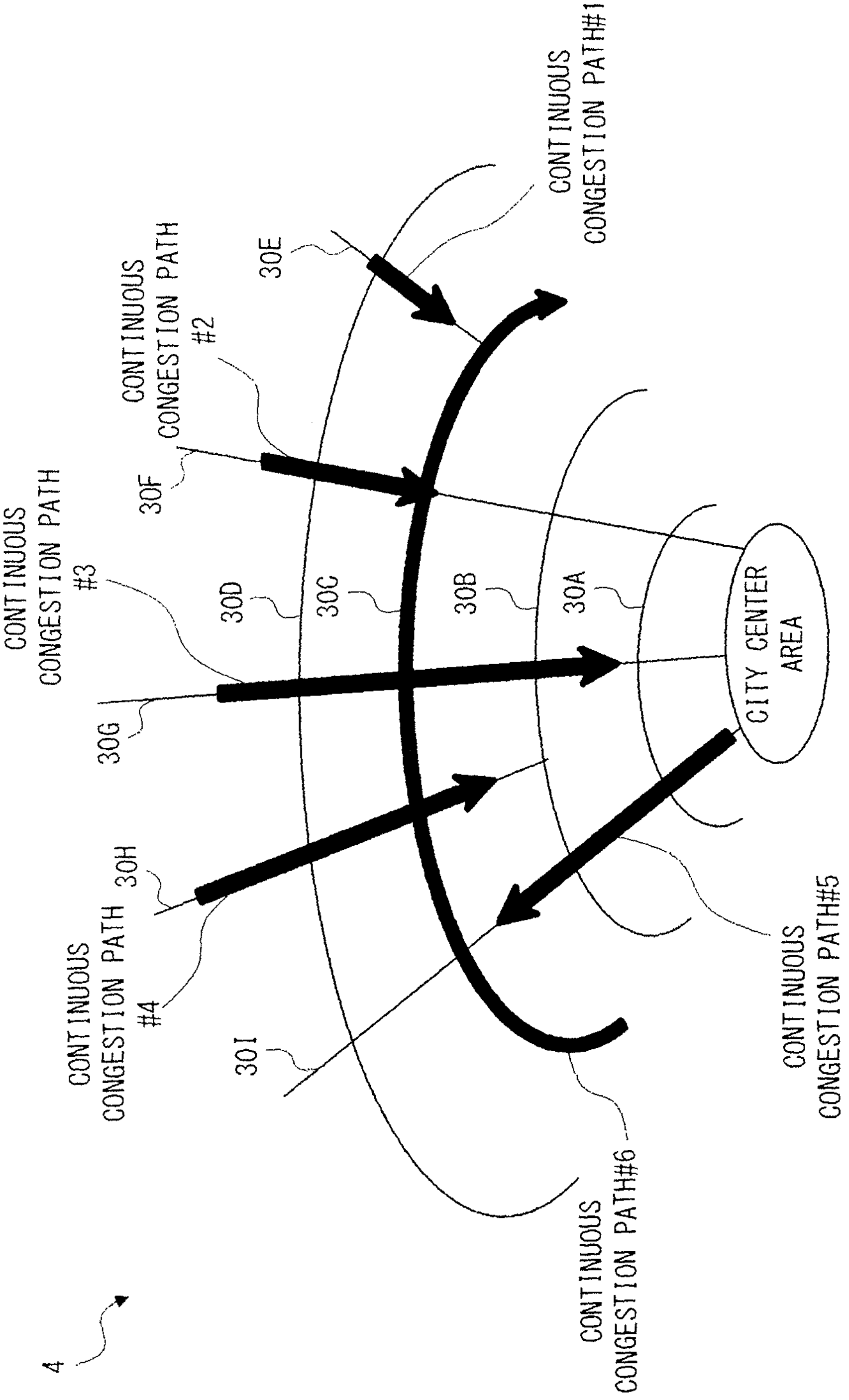
FIG. 29 is a diagram illustrating a road network including a plurality of continuous congestion paths.

FIG. 28 is a diagram illustrating the focus directions set by the focus direction setting unit 302 according to the third example embodiment. Further, FIG. 29 is a diagram illustrating the road network 4 including a plurality of continuous congestion paths. In the example shown in FIG. 29, roads 30A, 30B, 30C, and 30D are circle routes orbiting the city center area. Further, roads 30E, 30F, 30G, 30H, and 30I are radial routes radiating from the city center area.

Further, in the example shown in FIG. 29, there are continuous congestion paths #1, #2, #3, and #4 on the roads 30E, 30F, 30G, and 30H, respectively, the travelling direction being the direction toward the city center area. Further, there is a continuous congestion path #5 on the road 30I, the travelling direction being the direction away from the city center area. Further, there is a continuous congestion path #6 on the road 30C, the travelling direction being the clockwise direction centered around the city center area.

Regarding the radial routes, in the morning (e.g., 7 a.m. to 9 a.m.), the traffic demand for an inbound direction (a direction toward the city center area) is higher than the traffic demand for an outbound direction (a direction away from the city center area). On the other hand, in the evening (e.g., 4 p.m. to 7 p.m.), the traffic demand for the outbound direction of the radial routes is higher than the traffic demand for the inbound direction. Therefore, as illustrated in FIG. 28, regarding the radial routes, in the morning, the inbound direction is set as the focus direction, whereas in the evening, the outbound direction is set as the focus direction. That is, the priority calculation unit 304 calculates the priority level Pr so as to increase the priority level Pr of the continuous congestion path when one of the inbound direction and the outbound direction corresponds to the vehicle travelling direction of the continuous congestion path in accordance with the time zone of a day.

In the example shown in FIG. 29, in the processing of S314 and S316, in the morning hours, the priority calculation unit 304 increases the priority levels Pr of the continuous congestion paths #1, #2, #3, and #4 and decreases the priority level Pr of the continuous congestion path #5. On the other hand, in the processing of S314 and S316, in the evening hours, the priority calculation unit 304 increases the priority level Pr of the continuous congestion path #5 and decreases the priority levels Pr of the continuous congestion paths #1, #2, #3, and #4. As described above, the priority calculation unit 304 is able to appropriately calculate the priority level Pr in accordance with the time zone.

Further, regarding the circle routes, the traffic demand in the clockwise direction and that in the counterclockwise direction are both high regardless of the time zone. Therefore, as illustrated in FIG. 28, regarding the circle routes, both the clockwise direction and the counterclockwise direction are constantly set as the focus direction. In the example shown in FIG. 29, the priority calculation unit 304 increases the priority level Pr of the continuous congestion path #6 regardless of the time zone in the processing of S314 and S316.

As described above, by adding the priority level Pr when the travelling direction of the continuous congestion path corresponds to the focus direction, it becomes possible to preferentially deal with the path with high traffic demand. The priority level Pr may be added in stages in the processing of S316. For example, even when the travelling direction is the same, the priority level Pr may be increased as the continuous congestion path becomes closer to the city center area.

Next, the priority calculation unit 304 determines whether or not the number of lanes of the continuous congestion path is equal to or larger than a predetermined threshold Th1 (Step S318). Further, Th1 is, for example, 3. The number of lanes of the continuous congestion path may be an average value of the number of lanes in the entire course of the continuous congestion path. When the number of lanes is equal to or larger than Th1 (YES in S318), the priority calculation unit 304 adds the priority level Pr (Step S320). The added value may be set as appropriate depending on how much emphasis should be placed on the number of lanes when the priority is calculated.

When the congestion of the path having a large number of lanes is eliminated, the number of vehicles that can use this path increases. In other words, even when congestion of the path having a small number of lanes is eliminated, the number of vehicles that can use this path is not greatly increased compared to the case in which congestion of the path having a large number of lanes is eliminated. By increasing the priority level of the continuous congestion path having a large number of lanes, like in the third example embodiment, it is possible to preferentially deal with the path that has a great effect when the congestion is eliminated. Therefore, by using the traffic monitoring apparatus 100 according to the third example embodiment, it is possible to efficiently eliminate congestion in the entire city by efficiently using limited physical and human resources.

Note that the number of thresholds Th1 is not limited to one and may be plural. In this case, the priority level Pr may be added in stages. It is assumed, for example, that Th11=3 and Th12=4. In this case, the priority level Pr may be incremented by "1" when the number of lanes is equal to or larger than three but is smaller than four. Further, the priority level Pr may be incremented by "2" when the number of lanes is equal to or larger than four.

Next, the priority calculation unit 304 determines whether or not the congestion level of the continuous congestion path is equal to or larger than a predetermined threshold Th2 (Step S322). The congestion level of the continuous congestion path may be a total or an average value of the congestion levels Dj of the respective intersections 40 (the congestion levels Dj in the lane that corresponds to the travelling direction of the continuous congestion path) calculated in the processing shown in FIG. 7. When the congestion level of the continuous congestion path is equal to or larger than the threshold Th2 (YES in S322), the priority calculation unit 304 adds the priority level Pr (Step S324). The added value may be set as appropriate depending on how much emphasis should be placed on the congestion level when the priority is calculated.

The number of thresholds Th2 is not limited to one and may be plural. In this case, the priority level Pr may be added in stages as well. It is assumed, for example, that Th21 and Th22 (Th21<Th22) are set. In this case, the priority level Pr may be incremented by "1" when the congestion level is equal to or larger than Th21 but is smaller than Th22. Further, the priority level Pr may be incremented by "2" when the congestion level is equal to or larger than Th22.

Next, the priority calculation unit 304 determines whether or not the cost (resources) required for the countermeasures against the congestion cause of the continuous congestion path is equal to or smaller than a predetermined threshold Th3 (Step S326). The cost (resources) required for the countermeasures against the congestion cause include human and physical resources. The human resources include, for example, the number (man-hours) of on-site police officers etc. that should be dispatched. The physical resources are, for example, the number of security vehicles and construction vehicles that are required, expenses required for the operations thereof, etc.

The cost may indicate human and physical resources by numerical values in accordance with a predetermined function. Further, the cost may be proportional to the number of intersections (congestion-inducing intersections etc.) that should be dealt with in the continuous congestion path. That is, the priority may become higher as the number of intersections that should be dealt with becomes smaller. Further, the cost may be calculated by performing processing substantially similar to the processing that the cause determination unit 120 and the countermeasure presenting unit 130 perform (S250, S260 etc. of FIG. 20) for the continuous congestion path to be processed. In this case, in the countermeasure information illustrated in FIG. 17, the congestion cause (e.g., a "traffic accident") and the numerical values indicating the cost may be associated with each other in advance.

When the cost required for the countermeasures against the congestion cause is equal to or smaller than the threshold Th3 (YES in S326), the priority calculation unit 304 adds the priority level Pr (Step S328). The added value may be set as appropriate depending on how much emphasis should be placed on the cost when the priority is calculated. Note that the number of thresholds Th3 is not limited to one and may be plural. In this case, the priority level Pr may be added in stages. It is assumed, for example, that Th31 and Th32 (Th31<Th32) are set. In this case, the priority level Pr may be incremented by "1" when the congestion level is equal to or larger than Th31 but is smaller than Th32. Further, the priority level Pr may be incremented by "2" when the congestion level is equal to or larger than Th32.

As described above, the priority calculation unit 304 increases the priority level of the continuous congestion path as an amount of resources required for the countermeasures against the cause of the congestion of the continuous congestion path becomes smaller. Accordingly, by using the traffic monitoring apparatus 100 according to the third example embodiment, it is possible to preferentially eliminate congestion that can be eliminated with a small amount of resources when there are limitations in regard to the physical and human resources. Therefore, it is possible to efficiently eliminate congestion in the entire city by efficiently using limited physical and human resources.

Next, the priority calculation unit 304 determines whether or not the priorities have been calculated for all the continuous congestion paths (Step S330). When the priorities have not been calculated all the continuous congestion paths (NO in S330), the process goes back to the processing of S312. On the other hand, when the priorities have been calculated for all the continuous congestion paths (YES in S330), the priority calculation unit 304 ends the processing of S310.

Next, the cause determination unit 120 determines the congestion cause for at least one intersection 40 of the continuous congestion path whose priority level calculated in the processing of S310 is high (Step S350 in FIG. 26). Specifically, the cause determination unit 120 may determine the congestion cause of the continuous congestion path by performing processing substantially similar to the processing of S152 in FIG. 8 and the processing of S250 in FIG. 20. In this case, the cause determination unit 120 may determine, for example, the congestion cause of the continuous congestion path whose priority level is the highest or may determine the congestion cause of the continuous congestion path whose priority level is higher than a predetermined threshold. Accordingly, it becomes possible to determine the congestion cause of the continuous congestion path whose priority level is high more appropriately.

Further, when the continuous congestion path is a congested intersection group, the cause determination unit 120 determines the congestion cause of the intersection 40 (congestion-inducing intersection) at the top of this congested intersection group. Further, when the continuous congestion path includes a plurality of congested intersection groups, the cause determination unit 120 determines the congestion cause for each of the congestion-inducing intersections included in the continuous congestion path.

Then the countermeasure presenting unit 130 presents the countermeasure method against the congestion cause determined in S350 using the countermeasure information, similar to the processing of S160 in FIG. 6 and S260 in FIG. 20 (Step S360). Accordingly, the operator is able to easily examine the countermeasures against the cause of the congestion occurred in the continuous congestion path. Therefore, the countermeasures against congestion in the continuous congestion path can be taken more efficiently.

MODIFIED EXAMPLES

Note that the present disclosure is not limited to the aforementioned example embodiments and may be changed as appropriate without departing from the spirit of the present disclosure. For example, in the aforementioned flowcharts, the order of each process (step) may be changed as appropriate. Further, one or more of the plurality of processes (steps) may be omitted. For example, the process of S160 in FIG. 6 may be omitted. Further, one or more of the processes of S114, S118, and S122 in FIG. 7 may be omitted. Further, the process of S222 in FIG. 21 may be omitted. However, by performing the processing of S222, it is possible to determine the congestion-inducing intersection more appropriately. Further, the processing of S350 and S360 in FIG. 26 may be omitted. Further, one or more of the processes of S318, S322, and S326 of FIG. 27 may be omitted.

Further, while the cause information storage unit 122 and the countermeasure information storage unit 132 are provided in the traffic monitoring apparatus 100 in the aforementioned example embodiments, the configuration thereof is not limited thereto. The cause information storage unit 122 and the countermeasure information storage unit 132 may not be provided in the traffic monitoring apparatus 100. The cause information storage unit 122 and the countermeasure information storage unit 132 may be provided in an apparatus that can communicate with the traffic monitoring apparatus 100.

Further, while the countermeasure presenting unit 130 is configured to display the countermeasure method by images or the like in such a way that it can be visually recognized in the aforementioned example embodiments, the configuration thereof is not limited thereto. The countermeasure presenting unit 130 may present the countermeasure method by voices.

In the aforementioned examples, the program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The whole or part of the example embodiments disclosed above can be described as, but not limited to, the following supplementary notes.

(Supplementary Note 1)

A traffic monitoring apparatus comprising:

vehicle information acquisition means for acquiring vehicle information regarding travelling states of vehicles that are present in the vicinity of a plurality of respective intersections;

congestion determination means for determining, for each of the plurality of intersections, whether or not congestion is occurring based on the vehicle information and determining an intersection where the congestion has occurred to be a congested intersection; and priority calculation means for calculating, for each of a plurality of continuous congestion paths including a plurality of consecutive congested intersections, a priority level for implementing measures to eliminate congestion based on at least a vehicle travelling direction in the continuous congestion path.

(Supplementary Note 2)

The traffic monitoring apparatus according to Supplementary Note 1, wherein the priority calculation means increases the priority level of the continuous congestion path when the vehicle travelling direction in the continuous congestion path corresponds to a predetermined focus direction in a road network.

(Supplementary Note 3)

The traffic monitoring apparatus according to Supplementary Note 2, wherein the priority calculation means increases the priority level of the continuous congestion path when one of an inbound direction toward a central part of a city and an outbound direction away from the central part of the city corresponds to a vehicle travelling direction of the continuous congestion path in accordance with a time zone of a day.

(Supplementary Note 4)

The traffic monitoring apparatus according to any one of Supplementary Notes 1 to 3, wherein the priority calculation means increases the priority level of the continuous congestion path as the number of lanes of the continuous congestion path becomes larger.

(Supplementary Note 5)

The traffic monitoring apparatus according to any one of Supplementary Notes 1 to 4, wherein the priority calculation means increases the priority level of the continuous congestion path as an amount of resources required for a countermeasure against the cause of the congestion in the continuous congestion path becomes smaller.

(Supplementary Note 6)

The traffic monitoring apparatus according to any one of Supplementary Notes 1 to 5, further comprising cause determination means for determining the cause of the congestion for the at least one intersection of the continuous congestion path whose priority level is the highest or the continuous congestion path whose priority level is higher than a predetermined threshold.

(Supplementary Note 7)

The traffic monitoring apparatus according to Supplementary Note 6, further comprising countermeasure presenting means for presenting a countermeasure method against the cause of the congestion that has been determined by the cause determination means using countermeasure information in which the cause of the congestion and the countermeasure method are associated with each other.

(Supplementary Note 8)

A traffic monitoring system comprising:

a plurality of detection apparatuses configured to detect states of areas in the vicinity of a plurality of respective intersections; and a traffic monitoring apparatus configured to monitor traffic of the intersection, wherein the traffic monitoring apparatus comprises:

vehicle information acquisition means for acquiring vehicle information regarding travelling states of vehicles that are present in the vicinity of the plurality of respective intersections;

congestion determination means for determining, for each of the plurality of intersections, whether or not congestion is occurring based on the vehicle information and determining an intersection where the congestion has occurred to be a congested intersection; and priority calculation means for calculating, for each of a plurality of continuous congestion paths including a plurality of consecutive congested intersections, a priority level for implementing measures to eliminate congestion based on at least a vehicle travelling direction in the continuous congestion path.

(Supplementary Note 9)

The traffic monitoring system according to Supplementary Note 8, wherein the priority calculation means increases the priority level of the continuous congestion path when the vehicle travelling direction in the continuous congestion path corresponds to a predetermined focus direction in a road network.

(Supplementary Note 10)

The traffic monitoring system according to Supplementary Note 9, wherein the priority calculation means increases the priority level of the continuous congestion path when one of an inbound direction toward a central part of a city and an outbound direction away from the central part of the city corresponds to a vehicle travelling direction of the continuous congestion path in accordance with a time zone of a day.

(Supplementary Note 11)

The traffic monitoring system according to any one of Supplementary Notes 8 to 10, wherein the priority calculation means increases the priority level of the continuous congestion path as the number of lanes of the continuous congestion path becomes larger.

(Supplementary Note 12)

The traffic monitoring system according to any one of Supplementary Notes 8 to 11, wherein the priority calculation means increases the priority level of the continuous congestion path as an amount of resources required for a countermeasure against the cause of the congestion in the continuous congestion path becomes smaller.

(Supplementary Note 13)

The traffic monitoring system according to any one of Supplementary Notes 8 to 12, wherein the traffic monitoring apparatus further comprises cause determination means for determining the cause of the congestion for the at least one intersection on the continuous congestion path whose priority level is the highest or the continuous congestion path whose priority level is higher than a predetermined threshold.

(Supplementary Note 14)

The traffic monitoring system according to Supplementary Note 13, wherein the traffic monitoring apparatus further comprises countermeasure presenting means for presenting a countermeasure method against the cause of the congestion that has been determined by the cause determination means using countermeasure information in which the cause of the congestion and the countermeasure method are associated with each other.

(Supplementary Note 15)

A traffic monitoring method comprising:

acquiring vehicle information regarding travelling states of vehicles that are present in the vicinity of a plurality of respective intersections;

determining, for each of the plurality of intersections, whether or not congestion is occurring based on the vehicle information and determining an intersection where the congestion has occurred to be a congested intersection; and calculating, for each of a plurality of continuous congestion paths including a plurality of consecutive congested intersections, a priority level for implementing measures to eliminate congestion based on at least a vehicle travelling direction in the continuous congestion path.

(Supplementary Note 16)

The traffic monitoring method according to Supplementary Note 15, comprising increasing the priority level of the continuous congestion path when the vehicle travelling direction in the continuous congestion path corresponds to a predetermined focus direction in a road network.

(Supplementary Note 17)

The traffic monitoring method according to Supplementary Note 16, comprising increasing the priority level of the continuous congestion path when one of an inbound direction toward a central part of a city and an outbound direction away from the central part of the city corresponds to a vehicle travelling direction of the continuous congestion path in accordance with a time zone of a day.

(Supplementary Note 18)

The traffic monitoring method according to any one of Supplementary Notes 15 to 17, comprising increasing the priority level of the continuous congestion path as the number of lanes of the continuous congestion path becomes larger.

(Supplementary Note 19)

The traffic monitoring method according to any one of Supplementary Notes 15 to 18, comprising increasing the priority level of the continuous congestion path as the amount of resources required for a countermeasure against the cause of the congestion in the continuous congestion path becomes smaller.

(Supplementary Note 20)

The traffic monitoring method according to any one of Supplementary Notes 15 to 19, comprising determining the cause of the congestion for the at least one intersection of the continuous congestion path whose priority level is the highest or the continuous congestion path whose priority level is higher than a predetermined threshold.

(Supplementary Note 21)

The traffic monitoring method according to Supplementary Note 20, comprising presenting a countermeasure method against the cause of the congestion that has been determined using countermeasure information in which the cause of the congestion and the countermeasure method are associated with each other.

(Supplementary Note 22)

A non-transitory computer readable medium storing a program for causing a computer to execute the following steps of:

acquiring vehicle information regarding travelling states of vehicles that are present in the vicinity of a plurality of respective intersections;

determining, for each of the plurality of intersections, whether or not congestion is occurring based on the vehicle information and determining an intersection where the congestion has occurred to be a congested intersection; and calculating, for each of a plurality of continuous congestion paths including a plurality of consecutive congested intersections, a priority level for implementing measures to eliminate congestion based on at least a vehicle travelling direction in the continuous congestion path.

While the present disclosure has been described with reference to the example embodiments, the present disclosure is not limited by the above example embodiments. Various changes that may be understood by those skilled in the art may be made to the configurations and the details of the present disclosure within the scope of the present disclosure.

This application is based upon and claims the benefit of priority from Japanese Patent Application No. 2018-066014, filed on Mar. 29, 2018, the disclosure of which is incorporated herein in its entirety by reference.

REFERENCE SIGNS LIST

1 Traffic Monitoring System
10 Traffic Monitoring Apparatus
11 Vehicle Information Acquisition Unit
12 Additional Information Acquisition Unit
13 Congestion Determination Unit
14 Cause Determination Unit
15 Intersection Specifying Unit
16 Priority Calculation Unit
20 Detection Apparatus
100 Traffic Monitoring Apparatus
112 Vehicle Information Acquisition Unit
114 Additional Information Acquisition Unit
116 Congestion Determination unit
120 Cause Determination Unit
122 Cause Information Storage Unit
130 Countermeasure Presenting Unit
132 Countermeasure Information Storage Unit
202 Intersection Specifying Unit
204 Group Specifying Unit
302 Focus Direction Setting Unit
304 Priority Calculation Unit

The invention claimed is:

1. A traffic monitoring apparatus comprising:

hardware, including a processor and memory;

a vehicle information acquisition unit implemented at least by the hardware and configured to acquire vehicle information regarding travelling states of vehicles that are present in a vicinity of a plurality of respective intersections;

a congestion determination unit implemented at least by the hardware and configured to, for each lane crossing an intersection of the plurality of intersections, compare the vehicle information to one or more thresholds and determine the intersection to be a congested intersection based on the comparison;

an intersection specifying unit implemented at least by the hardware and configured to specify a plurality of consecutive congested intersections including the congested intersection;

a cause determination unit implemented at least by the hardware and configured to select a continuous congestion path in a vehicle travelling direction through each intersection of the plurality of consecutive congested intersections, determine congestion occurring at an upstream side of the congested intersection, and determine a cause of the congestion at the upstream side using image recognition; and a priority calculation unit implemented at least by the hardware and configured to calculate, for each of a plurality of continuous congestion paths including the plurality of consecutive congested intersections, a priority level for implementing countermeasures to eliminate congestion based on at least the vehicle travelling direction in the continuous congestion path and the determined cause, wherein the priority calculation unit increases the priority level of the continuous congestion path when the vehicle travelling direction in the continuous congestion path corresponds to a predetermined focus direction in a road network.

2. The traffic monitoring apparatus according to claim 1, wherein the priority calculation unit increases the priority level of the continuous congestion path when one of an inbound direction toward a central part of a city and an outbound direction away from the central part of the city corresponds to a vehicle travelling direction of the continuous congestion path in accordance with a time zone of a day.

3. The traffic monitoring apparatus according to claim 1, wherein the priority calculation unit increases the priority level of the continuous congestion path as the number of lanes of the continuous congestion path becomes larger.

4. The traffic monitoring apparatus according to claim 1, wherein the priority calculation unit increases the priority level of the continuous congestion path as an amount of resources required for a countermeasure against the cause of the congestion in the continuous congestion path becomes smaller.

5. The traffic monitoring apparatus according to claim 1, wherein the cause determination unit is further configured to determine the cause of the congestion for at least one intersection of the continuous congestion path whose priority level is the highest or the continuous congestion path whose priority level is higher than a predetermined threshold.

6. The traffic monitoring apparatus according to claim 5, further comprising a countermeasure presenting unit implemented at least by the hardware and configured to present a countermeasure method against the cause of the congestion that has been determined by the cause determination unit using countermeasure information in which the cause of the congestion and the countermeasure method are associated with each other.

7. A traffic monitoring system comprising:

a plurality of detection apparatuses configured to detect states of areas in the vicinity of a plurality of respective intersections; and the traffic monitoring apparatus according to claim 1.

8. The traffic monitoring system according to claim 7, wherein the priority calculation unit increases the priority level of the continuous congestion path when the vehicle travelling direction in the continuous congestion path corresponds to a predetermined focus direction in a road network.

9. The traffic monitoring system according to claim 8, wherein the priority calculation unit increases the priority level of the continuous congestion path when one of an inbound direction toward a central part of a city and an outbound direction away from the central part of the city corresponds to a vehicle travelling direction of the continuous congestion path in accordance with a time zone of a day.

10. The traffic monitoring system according to claim 7, wherein the priority calculation unit increases the priority level of the continuous congestion path as the number of lanes of the continuous congestion path becomes larger.

11. The traffic monitoring system according to claim 7, wherein the priority calculation unit increases the priority level of the continuous congestion path as an amount of resources required for a countermeasure against the cause of the congestion in the continuous congestion path becomes smaller.

12. The traffic monitoring system according to claim 7 wherein the cause determination unit is further configured to determine the cause of the congestion for at least one intersection on the continuous congestion path whose priority level is the highest or the continuous congestion path whose priority level is higher than a predetermined threshold.

13. A traffic monitoring method comprising:

acquiring vehicle information regarding travelling states of vehicles that are present in a vicinity of a plurality of respective intersections;

for each lane crossing an intersection of the plurality of intersections, comparing the vehicle information to one or more thresholds and determining the intersection to be a congested intersection based on the comparison;

specifying a plurality of consecutive congested intersections including the congested intersection;

selecting a continuous congestion path in a vehicle travelling direction through each intersection of the plurality of consecutive congested intersections;

determining congestion occurring at an upstream side of the congested intersection;

determining a cause of the congestion at the upstream side using image recognition;

calculating, for each of a plurality of continuous congestion paths including the plurality of consecutive congested intersections, a priority level for implementing countermeasures to eliminate congestion based on at least the vehicle travelling direction in the continuous congestion path and the determined cause; and increasing the priority level of the continuous congestion path when the vehicle travelling direction in the continuous congestion path corresponds to a predetermined focus direction in a road network.

14. The traffic monitoring method according to claim 13, comprising increasing the priority level of the continuous congestion path when one of an inbound direction toward a central part of a city and an outbound direction away from the central part of the city corresponds to a vehicle travelling direction of the continuous congestion path in accordance with a time zone of a day.

15. The traffic monitoring method according to claim 13, comprising increasing the priority level of the continuous congestion path as the number of lanes of the continuous congestion path becomes larger.

16. The traffic monitoring method according to claim 13, comprising increasing the priority level of the continuous congestion path as the amount of resources required for a countermeasure against the cause of the congestion in the continuous congestion path becomes smaller.

17. The traffic monitoring method according to claim 13, comprising determining the cause of the congestion for at least one intersection of the continuous congestion path whose priority level is the highest or the continuous congestion path whose priority level is higher than a predetermined threshold.

18. The traffic monitoring method according to claim 17, comprising presenting a countermeasure method against the cause of the congestion that has been determined using countermeasure information in which the cause of the congestion and the countermeasure method are associated with each other.

* * * * *